(12) United States Patent
Herzel

(10) Patent No.: US 10,129,038 B2
(45) Date of Patent: Nov. 13, 2018

(54) SYSTEM APPARATUS AND DEVICE FOR FACILITATING NETWORK EDGE DEVICE BACKUP AND METHODS OF OPERATION THEREOF

(71) Applicant: ENERGY RE-CONNECT LTD., Tel Aviv (IL)

(72) Inventor: Roni Herzel, Tel Aviv (IL)

(73) Assignee: ENERGY RE-CONNECT LTD., Tel Aviv (IL)

( * ) Notice: Subject to any disclaimer, the term of this patent is extended or adjusted under 35 U.S.C. 154(b) by 157 days.

(21) Appl. No.: 15/086,263

(22) Filed: Mar. 31, 2016

(65) Prior Publication Data

US 2017/0026188 A1    Jan. 26, 2017

Related U.S. Application Data

(63) Continuation-in-part of application No. 14/664,871, filed on Mar. 22, 2015, now Pat. No. 9,544,499,
(Continued)

(51) Int. Cl.
| | |
|---|---|
| *H04N 5/232* | (2006.01) |
| *H04N 5/765* | (2006.01) |
| *H04N 5/77* | (2006.01) |
| *H04N 7/18* | (2006.01) |
| *H04N 5/63* | (2006.01) |
| *H04L 12/10* | (2006.01) |

(Continued)

(52) U.S. Cl.
CPC ............... *H04L 12/10* (2013.01); *G06F 1/30* (2013.01); *H02J 7/0068* (2013.01); *H04N 5/23241* (2013.01); *H04N 5/765* (2013.01); *H04N 5/772* (2013.01); *H04N 7/181* (2013.01); *H04N 5/63* (2013.01)

(58) Field of Classification Search
CPC .......... H04L 12/10; G06F 1/30; H02J 7/0068; H04N 5/23241; H04N 5/765; H04N 5/772; H04N 7/181; H04N 5/63
See application file for complete search history.

(56) References Cited

U.S. PATENT DOCUMENTS

| | | | | |
|---|---|---|---|---|
| 2006/0186739 | A1* | 8/2006 | Grolnic | ............... G06F 1/30 307/64 |
| 2008/0294917 | A1* | 11/2008 | Khan | ............... G06F 1/3209 713/310 |

* cited by examiner

*Primary Examiner* — Thai Q Tran
*Assistant Examiner* — Christopher Braniff
(74) *Attorney, Agent, or Firm* — Vladimir Sherman; Professional Patent Solutions Ltd.

(57) ABSTRACT

Disclosed is a system apparatus and device for facilitating the backup of network edge devices and methods of operation thereof. A monitoring circuit(s) may detect inoperable electrical power condition(s) (IEPC) on the power-line of a network edge device. Upon detection of an IEPC a backup power source may provide electrical power to the edge device. Upon detection of a connectivity fault between the edge device and its packet sink, a packet sink emulator may emulate a packet sink of the edge device. The disclosed system apparatus and device may implement a Power over Ethernet (PoE) power backup device for providing power to one or more edge devices, the device comprising: a PoE input port, an auxiliary power input port, a PoE output port, a power storage circuits, and power management circuits for detecting available power, switching between power sources, and regulate the power switching based on power detection outputs.

15 Claims, 23 Drawing Sheets

Related U.S. Application Data which is a continuation-in-part of application No. 14/082,152, filed on Nov. 17, 2013, now Pat. No. 9,438,845.

(60) Provisional application No. 61/727,713, filed on Nov. 18, 2012.

(51) Int. Cl.
    *H02J 7/00*       (2006.01)
    *G06F 1/30*       (2006.01)

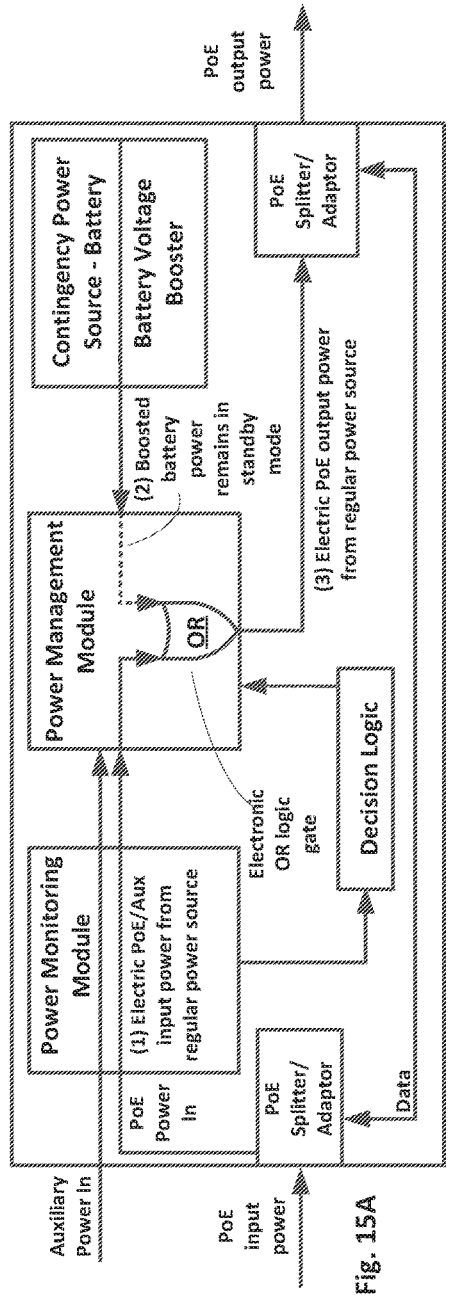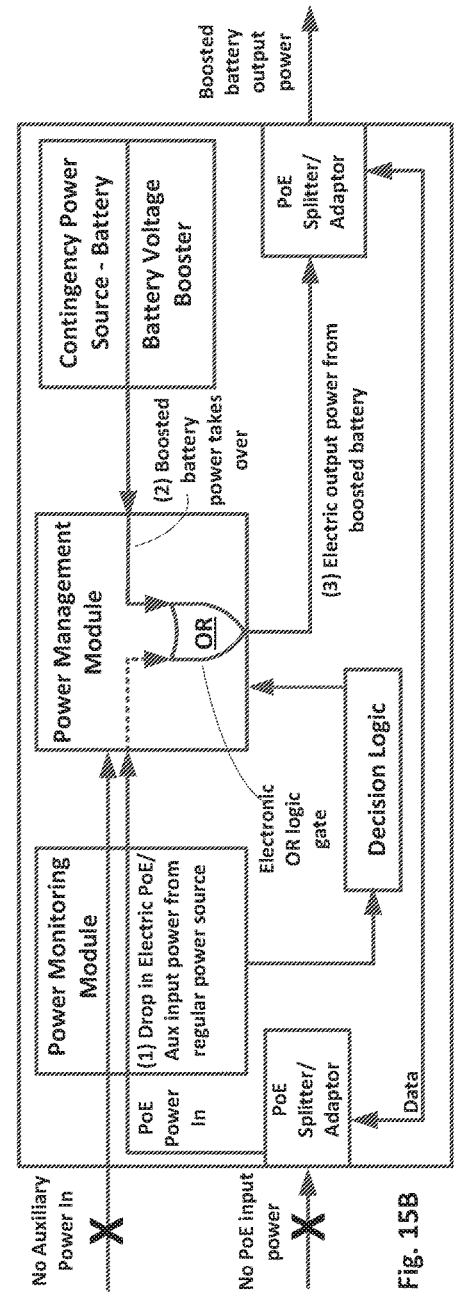
Fig. 15A
Fig. 15B

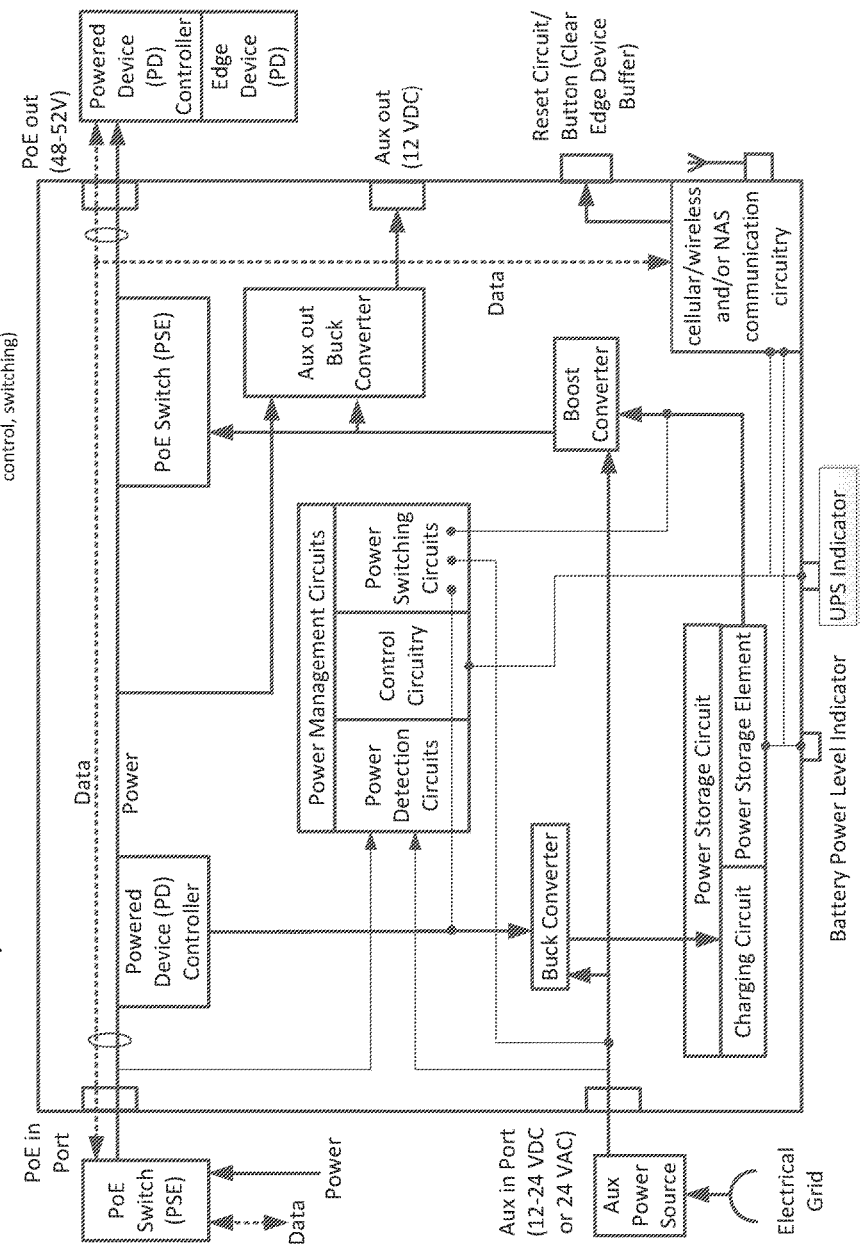

SYSTEM APPARATUS AND DEVICE FOR FACILITATING NETWORK EDGE DEVICE BACKUP AND METHODS OF OPERATION THEREOF

PRIORITY CLAIMS

The present application is a Continuation In Part (CIP) of U.S. patent application Ser. No. 14/082,152, filed Nov. 17, 2013, and of U.S. patent application Ser. No. 14/664,871, filed Mar. 22, 2015. U.S. patent application Ser. No. 14/664,871 is a Continuation In Part of U.S. patent application Ser. No. 14/082,152, which in turn claims priority from U.S. Provisional Patent Application No. 61/727,713, entitled: "A System Apparatus and Device for Facilitating Network Camera Backup and Methods of Operation Thereof", filed by the inventor of the present Application on Nov. 18, 2012. Each of the aforementioned applications is hereby incorporated by reference into the present Application in its entirety.

FIELD OF THE INVENTION

The present invention generally relates to the field of Power over Ethernet (hereinafter: 'PoE') and Network gear for Edge Device facilitation. More specifically, the present invention relates to a system apparatus and device for facilitating network edge device backup and continuous operation, and methods operation thereof.

BACKGROUND

An Internet protocol camera, or IP camera, is a type of digital video camera commonly employed for surveillance, and which unlike analog closed circuit television (CCTV) cameras can send and receive data via a computer network and the Internet. Although most cameras that do this are webcams, the term "IP camera" or "netcam" is usually applied only to those used for surveillance.

There are two kinds of IP cameras:

Centralized IP cameras, which require a central Network Video Recorder (NVR) to handle the recording, video and alarm management.

Decentralized IP cameras, which do not require a central Network Video Recorder (NVR), as the cameras have recording functionality built-in and can thus record directly to digital storage media, such as flash drives, hard disk drives or network attached storage.

The first centralized IP camera was released in 1996 by Axis Communications. It was called the Axis Neteye 200 and was developed by the team of Martin Gren and Carl-Axel Alm. It used a custom web server internal to the camera. In late 1999, the company started using embedded Linux to operate its cameras. Axis also released documentation for its low-level API called "VAPIX", which builds on the open standards of HTTP and real time streaming protocol (RTSP). This open architecture was intended to encourage third-party software manufacturers to develop compatible management and recording software.

The first decentralized IP camera was released in 1999 by Mobotix. The camera's Linux system contained video, alarm and recording management functionality, thus the camera system did not require licensed video management software to manage the recording, event and video management.

The first IP camera with onboard video content analytics (VCA) was released in 2005 by Intellio. This camera was capable of detecting a number of different events, such as an object was stolen, a human crosses a line, a human entered a predefined zone, a car goes the wrong way.

IP cameras are available at resolutions from 0.3 (VGA resolution) to 20 megapixels. As in the consumer TV business, in the early 21st century, there has been a shift towards high-definition video resolutions, e.g. 720p or 1080i and 16:9 widescreen format.

Taking the above into account, there clearly remains a need, in the field of network and IP Edge-Devices/Cameras, for better more efficient systems, apparatuses, devices and methods for network camera backup, and other network edge device backup, that may allow for network cameras and other network edge device to continue their operation while coping with various power, communication, storage and tampering scenarios.

SUMMARY OF THE INVENTION

Below are described a number of novel, innovative features of a system apparatus and device for facilitating network edge device (e.g. camera) backup and methods of operation thereof.

According to some embodiments of the present invention, an apparatus/device for facilitating network camera backup may be positioned between a networked camera (e.g. in or next to camera housing) and the network side of the camera to/from which data is communicated and from which regular electric power is supplied to the camera (e.g. data and power as PoE).

According to some embodiments of the present invention, the apparatus/device for facilitating network camera backup may comprise: a First PoE Splitter/Adaptor, on the network side of the apparatus/device, for separating the PoE provided data and power connections; a Power Monitoring Module for monitoring the quality and extracting electric parameters of electric power supplied by a regular power source; a Decision Logic for determining, based on the extracted electric parameters, if a drop in power quality has occurred and issuing a respective power source switching command; a Power Management Module including: a Charging Circuit for charging of, and a Backup Supply Circuit for switching from the regular power source to, a Contingency Power Source, in response to a power source switching command from the decision logic; and a Second PoE Splitter/Adaptor, on the camera side of the apparatus/device, for merging the separated data connection and the power connection of the contingency power source and relaying as PoE to the camera.

According to some embodiments of the present invention, the apparatus/device for facilitating network camera backup may be implemented as an independent unit that may be positioned within the housing of a network camera, and/or outside the housing, and possibly in substantial proximity to it, on the network side of the camera. According to some embodiments, the apparatus/device for facilitating network camera backup may be implemented as an integral, or partially integral, part of a network camera such that at least some of the components of the apparatus are integrated and/or embedded into camera circuit boards (e.g. main circuit board) also handling other camera operation related functionalities. Any of the features described hereinafter, or parts thereof, may be at least partially implemented by either: a network camera comprising integrated network camera backup functionalities and/or a standalone network camera backup apparatus functionally associated with a network camera.

Furthermore, the present invention may be implemented in various infrastructure, power, communication, and cabling environments. Accordingly, a variety of media converters and/or adapters, for switching between different physical Medias and/or converting analog signals/data to digital format and vice versa, may be used as part of many connection configurations of an apparatus in accordance with the present invention. According to some exemplary embodiments, a media converter may convert signal(s) travelling over fiber-optic, Coax, RJ45 and/or any other type of data carrying medium (e.g. cables) known today or to be devised in the future, to Ethernet compatible medium that may also be used for carrying power (e.g. PoE). An apparatus/device for facilitating network camera backup may, accordingly, comprise a media converter on its network side to convert network data signals of other medium types to over Ethernet signals; and/or a media converter on its camera side to convert camera data signals of other medium types to over Ethernet signals.

According to some embodiments of the present invention, a system, apparatus and device for facilitating network edge device backup and continuous operation may be adapted to switch, based on the extracted electric parameters, between a PoE based power source and at least two additional contingency power sources such as, but not limited to, one or more auxiliary power source(s) and/or one or more internal/external, possibly rechargeable, battery or battery packs.

According to some embodiments of the present invention, a device for Power over Ethernet (PoE) power backup may comprise: (1) a PoE input port to receive an Ethernet line from an Ethernet switch; (2) an auxiliary power input port to receive power from a low voltage power-supply; (3) a PoE output port to receive an Ethernet line to a PoE enabled edge device; (4) power storage circuits to store electrical power; and (5) power management circuits comprising: (a) power detection circuitry to detect available power on the PoE input port and on the auxiliary power input port; (b) power switching circuitry to switch available power from either of the input ports to the PoE output port, to the power storage circuits, wherein said power storage circuits include a power storage element and charging circuitry to charge the power storage element with switched available power from either of the input ports not used by the PoE enabled edge device; and (c) control circuitry to regulate the power switching circuitry based on an output from the power detection circuitry.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings:

FIGS. 15A and 15B are block diagrams showing the main modules and operation steps of an exemplary system for facilitating network camera backup, wherein an Electronic OR logic gate switches between boosted battery power (15B) and PoE input power (15A), in accordance with some embodiments of the present invention;

FIG. 19 is a block diagram showing the main modules and components of an exemplary edge device system including a device for Power over Ethernet (PoE) power backup, in accordance with some embodiments of the present invention, wherein the device comprises: a PoE input port, an auxiliary power input port, a PoE output port, power storage circuits, power management circuits, and an auxiliary power output port;

DETAILED DESCRIPTION

Figure 1:
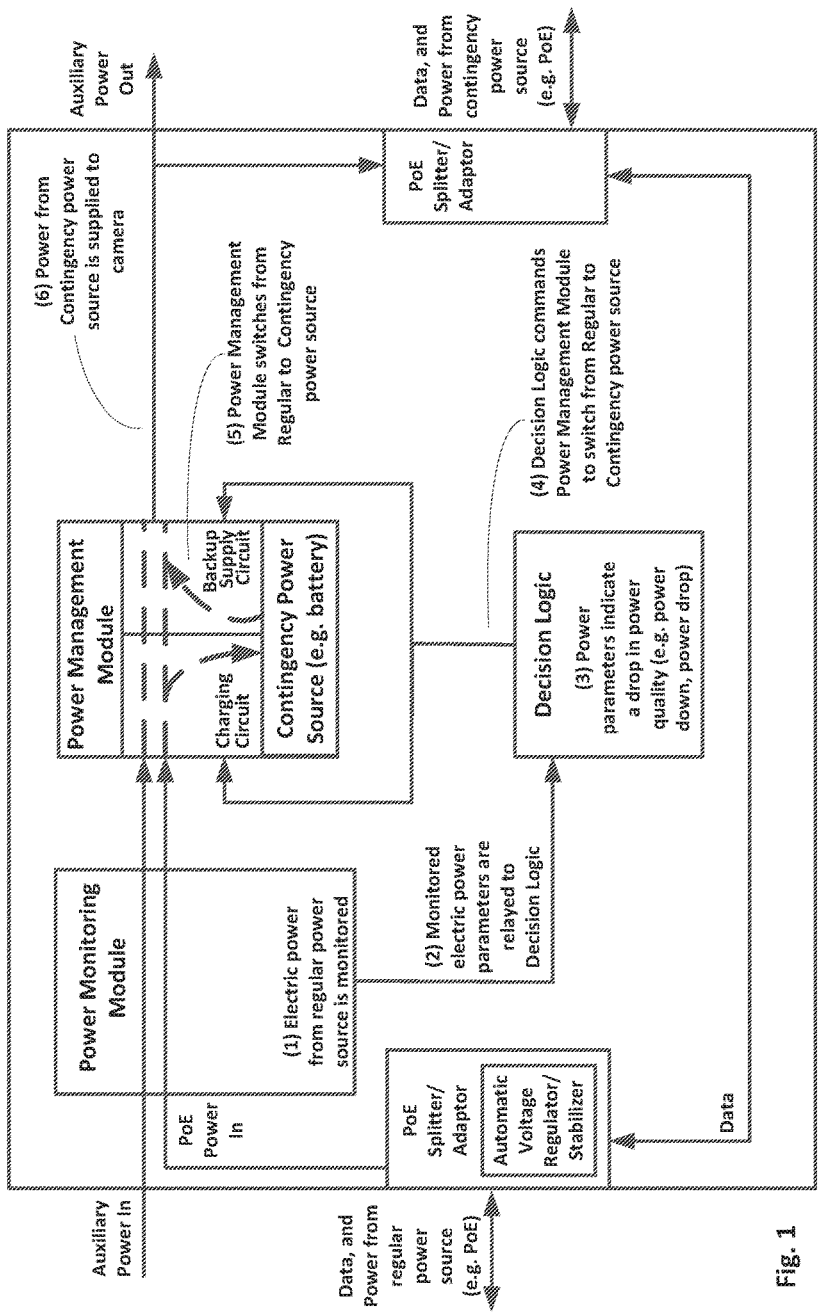
FIG. 1 is a block diagram showing the main modules and operation steps of an exemplary system for facilitating network camera backup, in accordance with some embodiments of the present invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. Such apparatus may be specially constructed for the desired purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The processes and displays presented herein, although generally directed to the backup of cameras and/or IP cameras, are not inherently related to any particular camera or electric equipment type. Various general-purpose systems and/or apparatuses may be used in accordance with the teachings herein, or it may prove convenient to construct a more specialized apparatus, to facilitate the backup of any type of PoE, or non-PoE, edge device, known today or to be devised in the future. The desired structure for a variety of these systems will appear from the description below. Such edge devices may include, but are in no way limited to: IP cameras, Wifi APs, IP phones, ADSL and cable modems, Media converters, IP PBXs, Access control controllers and ID readers, IP intercoms; and/or any edge device, known today or to be devised in the future.

In the following discussions utilization of the term Power over Ethernet (PoE) may refer to any constellation\standard that includes a combination of power supply and data propagation, through the same cable (e.g. different wires of same cable are separately used for power or data) and/or the same wire(s) (e.g. power and data signals run on same wire and are separated at sink based on amplitude or frequency). Teachings of the present invention may be likewise utilized as part of any installation between Power Sourcing Equipment (PSE) and one or more Power Devices (PD) regardless of how the data and power are delivered between them, this may also include, but is not limited to, new standards such as Power Over HDBaseT (POH) (e.g. IEEE 802.3at standard) that may enable the transfer of DC power in conjunction with data signals over a single Ethernet cable to a distance of up to 100 meters (m), and/or any other standard, known today or to be devised in the future.

General

The present invention is a system, apparatus, and device for facilitating network camera backup and methods of operation thereof. According to some embodiments of the present invention, an apparatus/device for facilitating network camera backup may be positioned between a networked camera (e.g. in or next to camera housing) and the network side of the camera to/from which data is communicated and from which regular electric power is supplied to the camera (e.g. data and power as PoE).

According to some embodiments of the present invention, the apparatus/device for facilitating network camera backup may comprise: a First PoE Splitter/Adaptor, on the network side of the apparatus/device, for separating the PoE provided data and power connections; a Power Monitoring Module for monitoring the quality and extracting electric parameters of electric power supplied by a regular power source; a Decision Logic for determining, based on the extracted electric parameters, if a drop in power quality has occurred and issuing a respective power source switching command; a Power Management Module, including a Charging Circuit for charging of, and a Backup Supply Circuit for switching from the regular power source to, a Contingency Power Source, in response to a power source switching command from the decision logic; and/or a Second PoE Splitter/Adaptor, on the camera side of the apparatus/device, for merging the separated data connection and the power connection of the contingency power source and relaying as PoE to the camera.

According to some embodiments of the present invention, the apparatus/device for facilitating network camera backup may be implemented as an independent unit that may be positioned within the housing of a network camera, and/or outside the housing, and possibly in substantial proximity to it, on the network side of the camera. According to some embodiments, the apparatus/device for facilitating network camera backup may be implemented as an integral, or partially integral, part of a network camera such that at least some of the components of the apparatus are integrated and/or embedded into camera circuit boards (e.g. main circuit board) also handling other camera operation related functionalities. Any of the features described hereinafter, or parts thereof, may be at least partially implemented by either: a network camera comprising integrated network camera backup functionalities and/or a standalone network camera backup apparatus functionally associated with a network camera.

Embodiments of the present invention may be implemented in various infrastructure, power, communication, and cabling environments. Accordingly, a variety of media converters and/or adapters, for switching between different physical medias and/or converting analog signals/data to digital format and vice versa, may be used as part of many connection configurations of an apparatus in accordance with the present invention. According to some exemplary embodiments, a media converter may convert signal(s) travelling over fiber-optic, Coax, RJ45 and/or any other type of data carrying medium (e.g. cables) known today or to be devised in the future, to Ethernet compatible medium that may also be used for carrying power (e.g. PoE). An apparatus/device for facilitating network camera backup may, accordingly, comprise a media converter on its network side to convert network data signals of other medium types to over Ethernet signals; and/or a media converter on its camera side to convert camera data signals of other medium types to over Ethernet signals.

According to some embodiments of the present invention, the system/apparatus/device may comprise, or be functionally associated with an AVR/S (Automatic Voltage Regulator/Stabilizer) for protecting against power surges, spikes and/or noise. An AVR/S may be implemented as part of the invention system/apparatus/device in order to protect the camera, camera recorded data, and/or other system components, from lightning or power-grid originating, potentially damaging, power scenarios.

In FIG. 1 there are shown, in accordance with some embodiments of the present invention, the main modules and operation steps of an exemplary system/apparatus for facilitating network camera backup, in accordance with some embodiments of the present invention.

Low Voltage Mid-Span

According to some embodiments of the present invention, a system, apparatus and device for facilitating network edge device backup and continuous operation may be adapted to switch, based on the extracted electric parameters, between a PoE based power source and at least two additional contingency power sources such as, but not limited to, one or more auxiliary power source(s) and/or one or more internal/external, possibly rechargeable, battery or battery packs.

According to some embodiments of the present invention, a device for Power over Ethernet (PoE) power backup may comprise: (1) a PoE input port to receive an Ethernet line from an Ethernet switch; (2) an auxiliary power input port to receive power from a low voltage power-supply; (3) a PoE output port to receive an Ethernet line to a PoE enabled edge device; (4) power storage circuits to store electrical power; and (5) power management circuits comprising: (a) power detection circuitry to detect available power on the PoE input port and on the auxiliary power input port; (b) power switching circuitry to switch available power from either of the input ports to the PoE output port, to the power storage circuits, wherein said power storage circuits include a power storage element and charging circuitry to charge the power storage element with switched available power from either of the input ports not used by the PoE enabled edge device; and (c) control circuitry to regulate the power switching circuitry based on an output from the power detection circuitry.

According to some embodiments, the device for Power over Ethernet (PoE) power backup may further comprise: (6) a voltage step up converter, for example a boost converter, for increasing the voltage (e.g. to a PoE compatible voltage—48-52 volts) of the electric power from either the auxiliary power input port and/or the power storage circuits; and (7) a PoE switch for combining/injecting power, from either the auxiliary power input port and/or the power storage circuits, into the PoE output port received Ethernet line, for supplying the PoE enabled edge device(s). According to some embodiments, the operation of the boost converter and the PoE switch may be triggered as a result of the control circuitry regulating the power switching circuitry, based on an output from the power detection circuitry.

According to some embodiments, the device for Power over Ethernet (PoE) power backup may further comprise: (8) cellular/wireless communication circuitry and/or a Network Attached Storage (NAS) communication circuitry for communicating edge device generated data to a networked data storage destination; and (9) data storage destination switching circuitry regulated by the control circuitry based on outputs from the power detection circuitry, for switching data communication to the networked data storage destination.

According to some embodiments of the present invention, the device may further comprise (10) an auxiliary power output circuit switchably connected to either of the power input ports, and optionally also to the power storage circuit. According to some embodiments, power from the PoE input port, and/or power from the auxiliary power input port routed through the boost converter, may be routed through (11) an auxiliary out voltage step down converter, for example a buck converter, and onward to supply power to the auxiliary power output circuit. According to some embodiments, the control circuitry may be further adapted to cause the power management circuits to reduce power supplied to the auxiliary power output circuit responsive to the power detection circuitry detecting a power loss or power drop condition with power supplied through the PoE input port or the auxiliary power input port.

According to some embodiments of the present invention, the control circuitry may be further adapted to cause the power management circuits to draw relatively more power from the auxiliary input port than from the PoE power input port responsive to the power detection circuits detecting a power loss or power drop condition in power supplied through the PoE input port. According to some embodiments of the present invention, the control circuitry may be further adapted to cause the power management circuits to draw power from the power storage circuits, responsive to the power detection circuitry detecting a power loss or power drop condition in power supplied through: (a) the PoE input port, (b) the auxiliary power input port, or (c) both ports.

According to some embodiments of the present invention, the control circuitry may be further adapted to cause the power switching circuitry to switch surplus power supplied through the PoE input port or the auxiliary power input port for supplying the charging circuit with power to charge the power storage element; surplus power for charging, supplied through the PoE input port or the auxiliary power input port, may be routed through a voltage step down converter, for example a buck converter. According to some embodiments, the power storage element may be a rechargeable battery. According to some embodiments, the control circuitry may be further adapted to cause the power switching circuitry to switch from power supplied through the PoE input port, or from power supplied through the auxiliary power input port, to power from the backup power storage element, upon the power detection circuits detecting a power loss or power drop condition on either or both input ports.

According to some embodiments of the present invention, a Power over Ethernet (PoE) power backup device may further comprise an uninterruptible power supply (UPS) indicator for indicating when power from either (a) the PoE input port, (b) the auxiliary power input port, or (c) both ports, is lost or dropped; and/or when power from the power storage element has been switched to, by the power switching circuitry.

According to some embodiments, a Power over Ethernet (PoE) power backup device may further comprise a battery power level indicator for indicating the power level (i.e. charging level) of the power storage element.

According to some embodiments, a Power over Ethernet (PoE) power backup device may further comprise a reset circuit/button for clearing up edge device data storage element(s) or buffer(s) wherein data collected by, and/or associated with the operation of, the edge device is accumulated.

According to some embodiments, indications made by the uninterruptible power supply (UPS) indicator and/or by the battery power level indicator, and/or instructions to the reset circuitry, may be communicated from/to the Power over Ethernet (PoE) power backup device through the cellular/wireless communication circuitry to/from a user(s) of a remote/networked computerized communication device/platform.

According to some embodiments, power from the auxiliary power output circuit may be utilized for support of the edge device's operation, and/or support of edge device peripheral components such as, but not limited to, an audio amplifier connected to the edge device (e.g. an IP camera edge device).

According to some embodiments of the present invention, an edge device system may comprise one or more edge devices, and one or more respective devices for Power over Ethernet (PoE) power backup, connected to each of the one or more edge devices, wherein each of the Power over Ethernet (PoE) power backup devices may comprise: (1) a PoE input port to receive an Ethernet line from an Ethernet switch; (2) an auxiliary power input port to receive power from a low voltage power-supply; (3) a PoE output port to receive an Ethernet line to a PoE enabled edge device; (4) power storage circuits to store electrical power; and (5) power management circuits comprising: (a) power detection circuitry to detect available power on the PoE input port and on the auxiliary power input port; (b) power switching circuitry to switch available power from either of the input ports to the PoE output port, to the power storage circuits, wherein said power storage circuits include a power storage element and charging circuitry to charge the power storage element with switched available power from either of the input ports not used by the PoE enabled edge device; and (c) control circuitry to regulate the power switching circuitry based on an output from the power detection circuitry.

According to some embodiments, Power over Ethernet (PoE) power backup devices of the edge device system, may comprise any feature or functionality of a Power over Ethernet (PoE) power backup device described above, and/or any combination thereof.

According to some embodiments of the present invention, providing power to one or more edge devices may comprise: (1) receiving power through a PoE input port connected to an Ethernet line from an PoE enabled Ethernet switch; (2) receiving power through an auxiliary power input port connected to a low voltage power-supply; (3) providing power to a PoE output port connected with an Ethernet line to a PoE enabled edge device; (4) storing surplus power on power storage circuits; and/or (5) managing power switching between ports and power storage circuits by: (a) automatically detecting available power on the PoE input port and on the auxiliary power input port, and (b) automatically regulating power switching based on power detection.

In FIG. 19 there is shown, in accordance with some embodiments of the present invention, an exemplary edge device system including a device for Power over Ethernet (PoE) power backup, and wherein the device comprises: a PoE input port, an auxiliary power input port, a PoE output port, power storage circuits, power management circuits, and an auxiliary power output port.

Figure 20A:
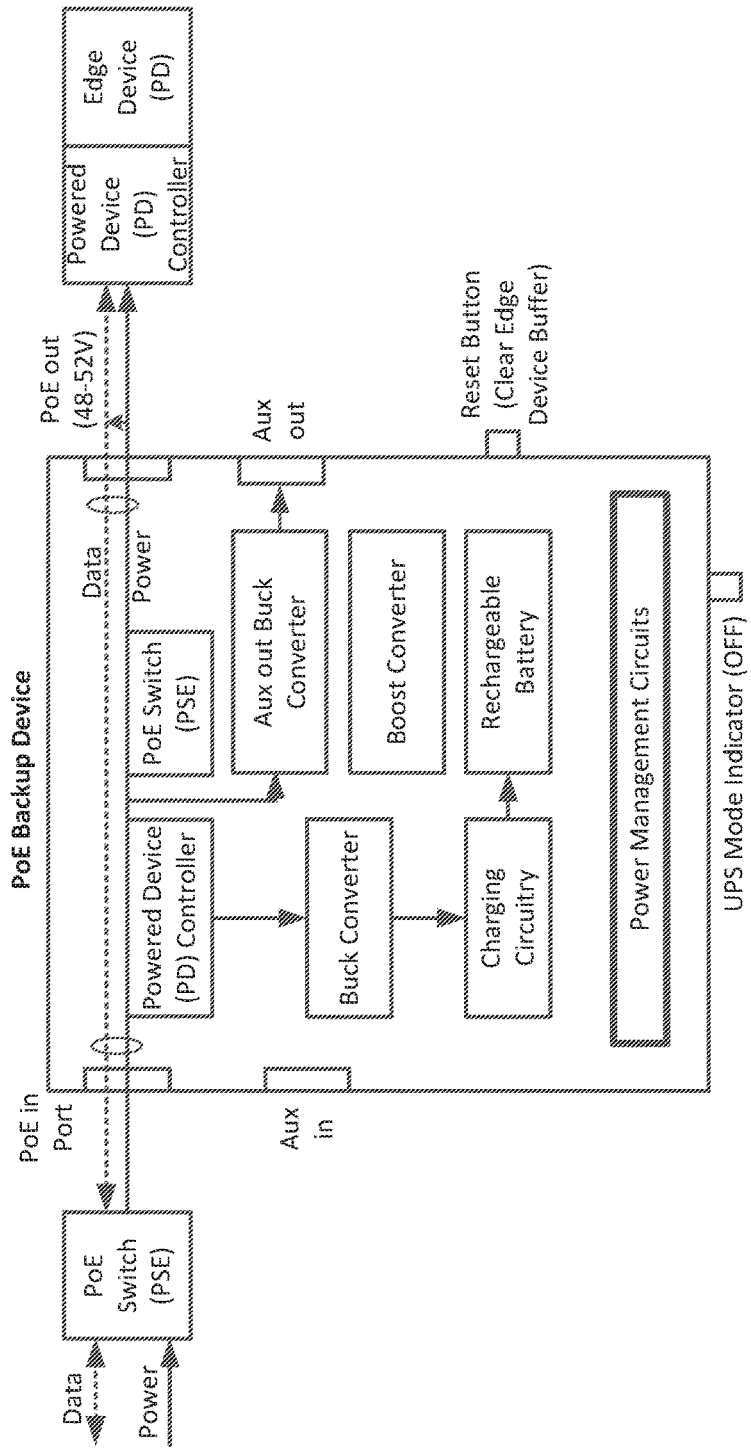
FIGS. 20A-20C are block diagrams showing, in accordance with some embodiments of the present invention, an exemplary edge device system including a device for Power over Ethernet (PoE) power backup, wherein the device is shown in the following PoE power supply configurations, wherein: electric power from the PoE input port is shown to supply power to: the edge device, the auxiliary out port, and the charging circuitry of the 'power storage element'/'rechargeable battery' (20A); electric power from the auxiliary in port is shown to supply power to: the edge device, the auxiliary out port, and the charging circuitry of the 'power storage element'/'rechargeable battery' (20B); electric power from the 'power storage element'/'rechargeable battery' is shown to supply power to: the edge device, and the auxiliary out port (20C)
Figure 20B:
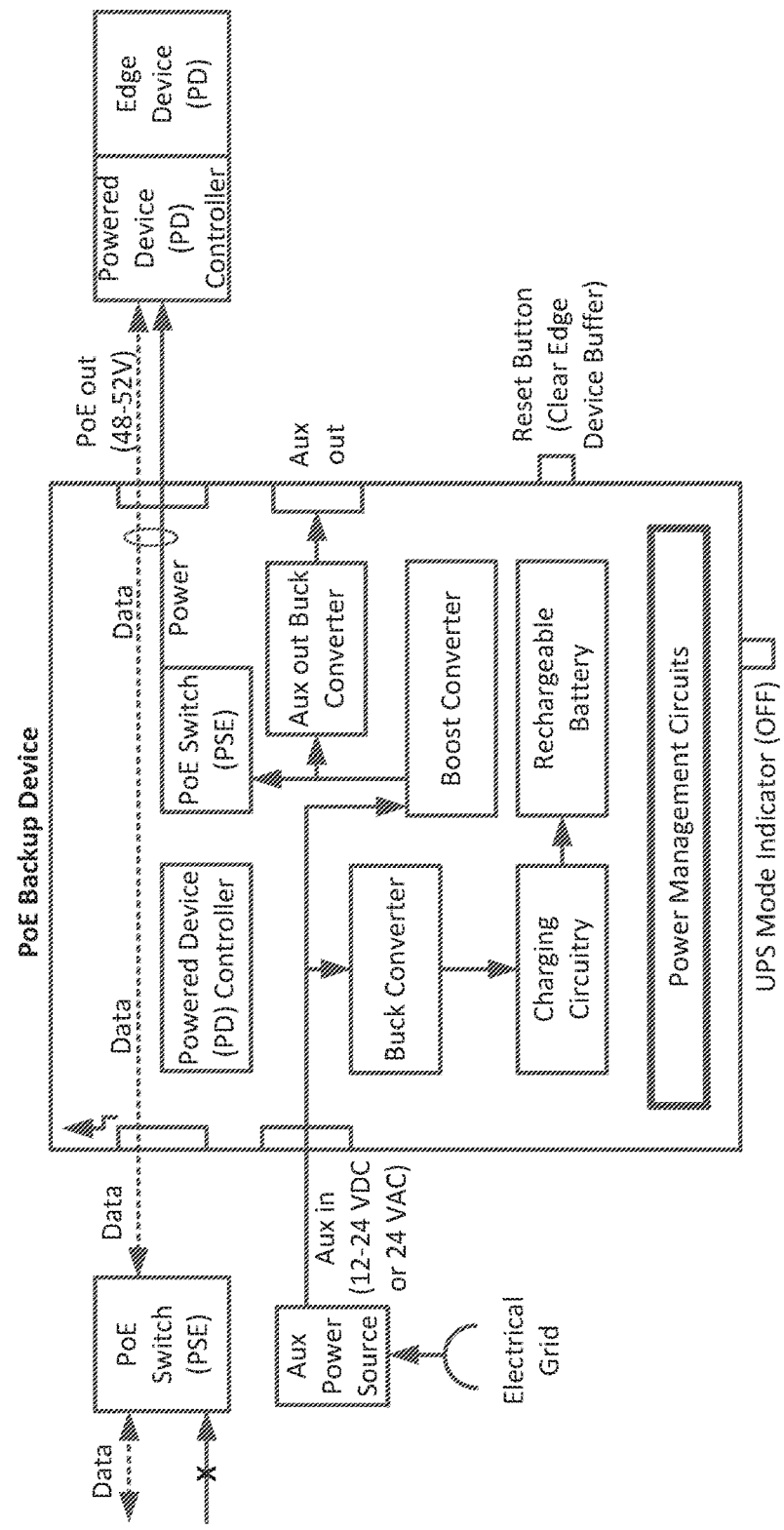
Figure 20C:
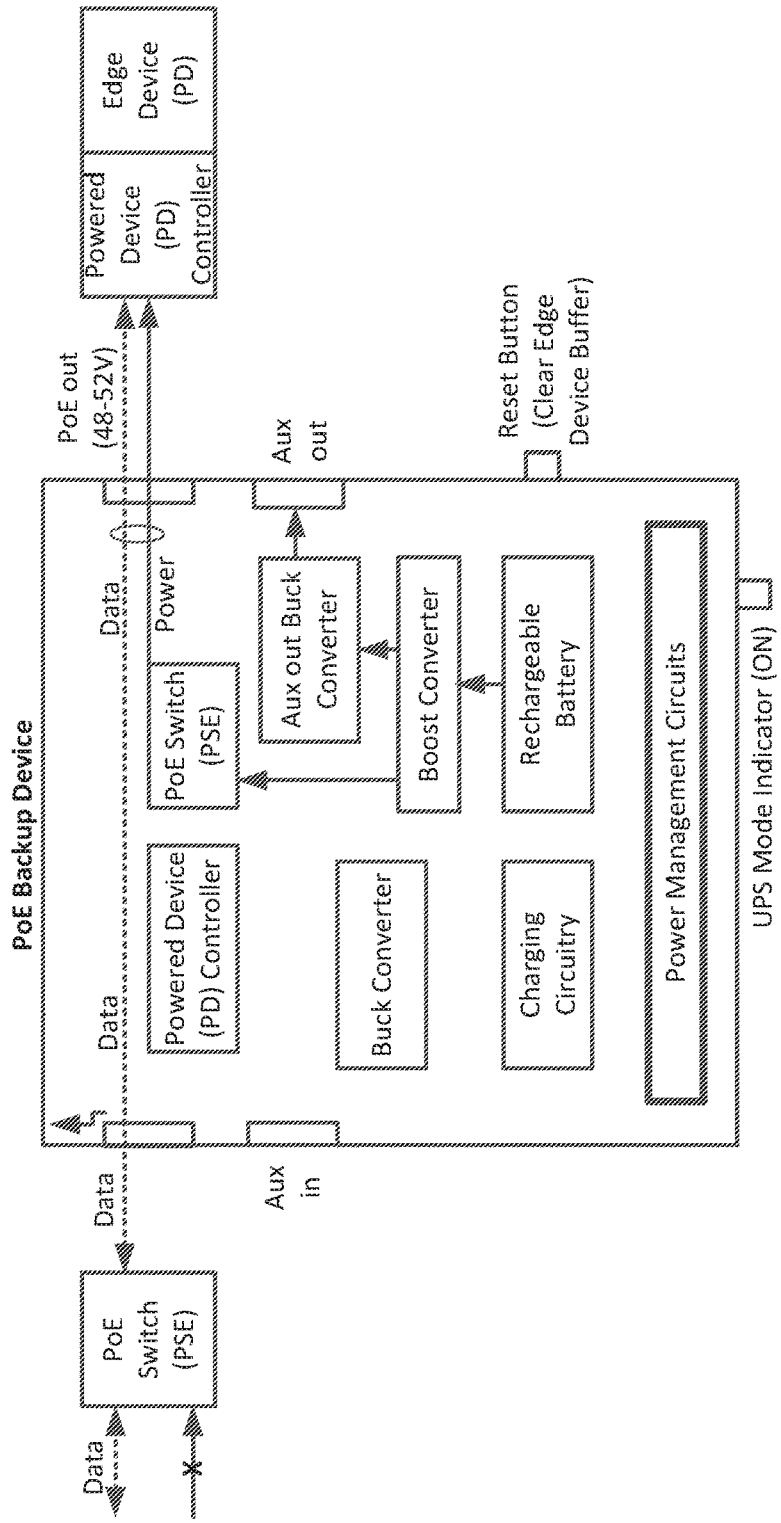

In FIGS. 20A-20C there is shown, in accordance with some embodiments of the present invention, an exemplary edge device system including a device for Power over Ethernet (PoE) power backup, and wherein the device is shown in the following PoE power supply configurations, wherein: electric power from the PoE input port is shown to supply power to: the edge device, the auxiliary out port, and the charging circuitry of the 'power storage element'/'rechargeable battery' (20A); electric power from the auxiliary in port is shown to supply power to: the edge device, the auxiliary out port, and the charging circuitry of the 'power storage element'/'rechargeable battery' (20B); electric power from the 'power storage element'/'rechargeable battery' is shown to supply power to: the edge device, and the auxiliary out port (20C).

Figure 21:
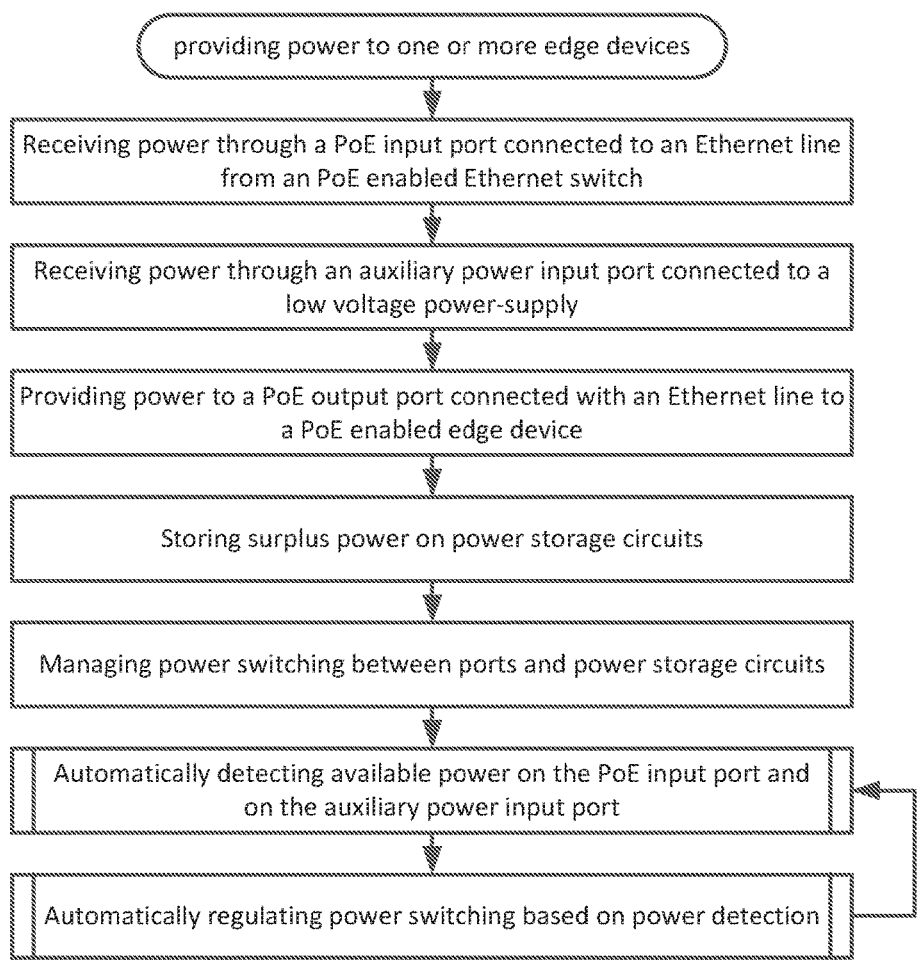
FIG. 21 is a flow chart showing, in accordance with some embodiments of the present invention, the main operation steps of an exemplary edge device system including a device for Power over Ethernet (PoE) power backup.

In FIG. 21 there are shown, in accordance with some embodiments of the present invention, main operation steps of an exemplary edge device system including a device for Power over Ethernet (PoE) power backup.

According to some embodiments of the present invention, a Power over Ethernet (PoE) power backup device for providing power to one or more edge device, may comprise: a PoE input port to receive an Ethernet line from an Ethernet switch; an auxiliary power input port to receive power from a low voltage power-supply; a PoE output port to connect with an Ethernet line to a PoE enabled edge device; a power storage circuits to store electrical power; and power management circuits that may comprise: power detection circuitry to detect available power on the PoE input port and on the auxiliary power input port; power switching circuitry to switch available power from either of the input ports to the PoE output port, to the power storage circuit, wherein the power storage circuit may include a power storage element and a charging circuit to charge the power storage element with switched available power from either of the input ports not used by PoE enabled edge device; and control circuitry to regulate the power switching circuits based on an output from the power detection circuits.

According to some embodiments, the device may further comprise an auxiliary power output circuit switchably connected to either of the power input ports and optionally also to the power storage circuit.

According to some embodiments, the control circuitry may be further adapted to cause the power management circuits to reduce power supplied to the auxiliary power output circuit responsive to the power detection circuits detecting a power drop condition with power supplied through said PoE input port or the auxiliary power input port.

According to some embodiments, the control circuitry may be further adapted to cause the power management circuits to draw relatively more power from the auxiliary input port than from the PoE power input port responsive to the power detection circuits detecting a power drop condition in power supplied through the PoE input port.

According to some embodiments, the control circuitry may be further adapted to cause the power management circuits to draw power from the power storage circuitry responsive to the power detection circuitry detecting a power drop condition in power supplied through: (a) said PoE input port, (b) said auxiliary power input port, or (c) both ports.

According to some embodiments, the control circuitry may be further adapted to cause the power switching circuitry to switch surplus power supplied through the PoE input port or the auxiliary power input port for charging the power storage element. The power storage element may be a rechargeable battery. The control circuitry may be further adapted to cause the power switching circuitry to switch from power supplied through the PoE input port, or from power supplied through the auxiliary power input port, to power from the backup power storage element, upon the power detection circuits detecting a power loss or power drop condition on either or both input ports.

According to some embodiments of the present invention, a Power over Ethernet (PoE) power backup system for providing power to one or more edge devices, may comprise: one or more edge devices; and a Power over Ethernet (PoE) power backup device for providing power to one or more of the edge devices, wherein the backup device may comprise: a PoE input port to receive an Ethernet line from an Ethernet switch; an auxiliary power input port to receive power from a low voltage power-supply; a PoE output port to connect with an Ethernet line to a PoE enabled edge device; a power storage circuits to store electrical power; and power management circuits that may comprise: power detection circuitry to detect available power on the PoE input port and on the auxiliary power input port; power switching circuitry to switch available power from either of the input ports to the PoE output port and to the power storage circuit, wherein the power storage circuit includes a power storage element and a charging circuit to charge the power storage element with switched available power not used by PoE enabled edge device; and control circuitry to regulate the power switching circuits based on an output from the power detection circuits.

According to some embodiments, the device may further comprise an auxiliary power output circuit switchably connected to either of the power input ports and optionally also to the power storage circuit.

According to some embodiments, the control circuitry may be further adapted to cause the power management circuits to reduce power supplied to the auxiliary power output circuit responsive to the power detection circuits detecting a power drop condition with power supplied through the PoE input port or the auxiliary power input port.

According to some embodiments, the control circuitry may be further adapted to cause the power management circuits to draw relatively more power from the auxiliary input port than from the PoE power input port responsive to the power detection circuits detecting a power drop condition in power supplied through the PoE input port.

According to some embodiments, the control circuitry may be further adapted to cause the power management circuits to draw power from the power storage circuitry responsive to the power detection circuitry detecting a power drop condition in power supplied through: (a) the PoE input port, (b) the auxiliary power input port, or (c) both ports.

According to some embodiments, the control circuitry may be further adapted to cause the power switching circuitry to switch surplus power supplied through the PoE input port or the auxiliary power input port for charging the power storage element. The power storage element may be a rechargeable battery.

According to some embodiments, the control circuitry may be further adapted to cause the power switching circuitry to switch from power supplied through the PoE input port, or from power supplied through the auxiliary power input port, to power from the backup power storage element, upon the power detection circuits detecting a power loss or power drop condition on either or both input ports.

According to some embodiments of the present invention, a method of providing power to one or more edge devices may comprise: receiving power through a PoE input port connected to an Ethernet line from an PoE enabled Ethernet switch; receiving power through an auxiliary power input port connected to a low voltage power-supply; providing power to a PoE output port connected with an Ethernet line to a PoE enabled edge device; storing surplus power on a power storage circuits; and managing power switching between ports and power storage circuits by: automatically detecting available power on the PoE input port and on the auxiliary power input port; and automatically regulating power switching based on power detection.

Contingency Power and Battery Recharge

According to some embodiments of the present invention, the contingency power source may be a battery; according to some embodiments, the contingency power source may be rechargeable battery. The apparatus/device may comprise: a Contingency Power Source Charging Module for using external and/or internal electric power from the regular power source (i.e. while available)—PoE, and/or Auxiliary Power—for charging the rechargeable battery contingency power source. According to some embodiments, the Power Management Module may switch between the regular power source (e.g. PoE line) and two or more contingency power sources, in response to a power source switching command from the decision logic. For example, the Power Management Module may initially switch to an auxiliary backup power source—in response to a drop in power quality in the regular power source, and may later switch to a rechargeable battery backup power source—in response to a drop in power quality in the auxiliary backup power source.

Figure 2:
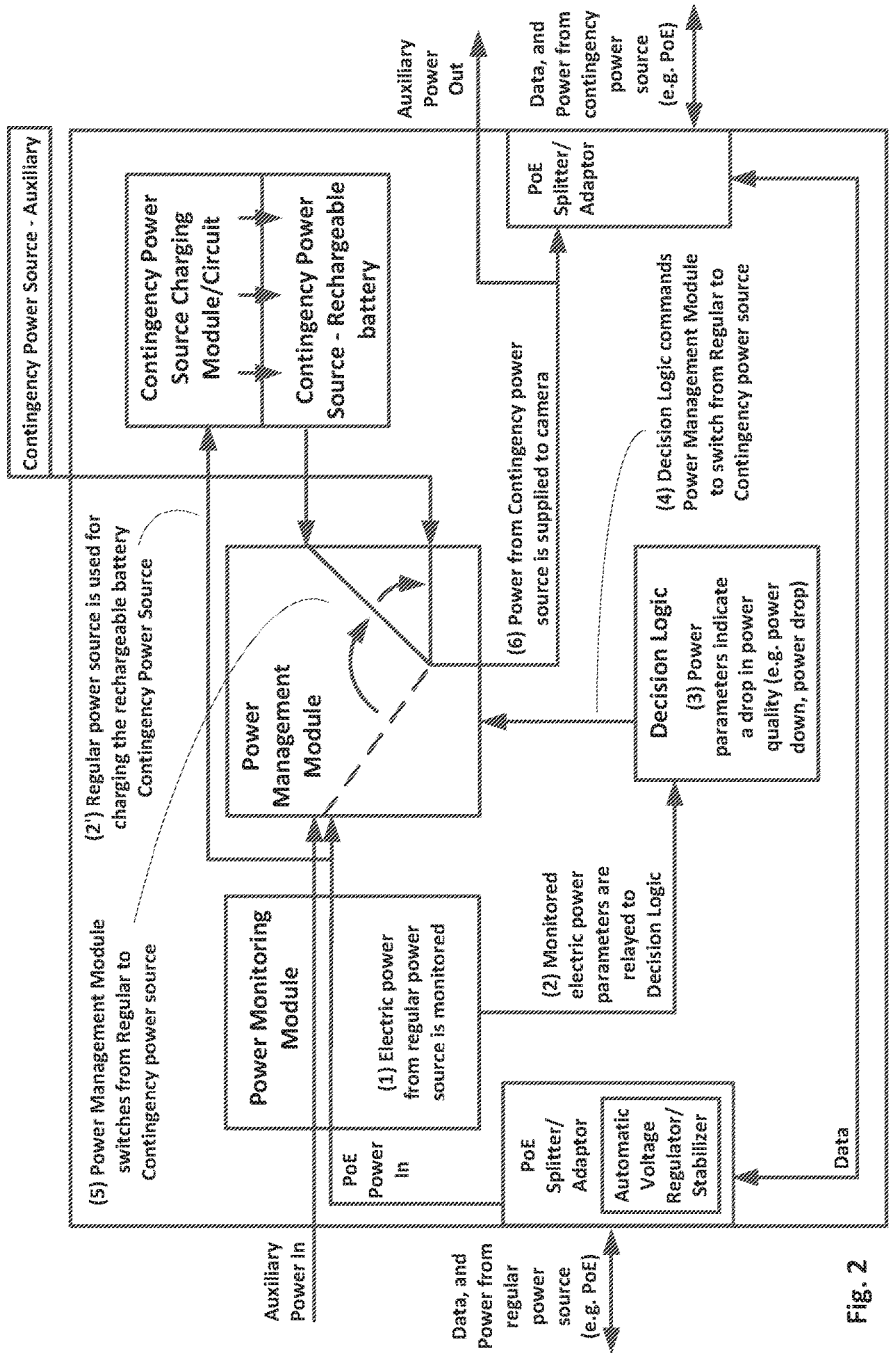
FIG. 2 is a block diagram showing the main modules and operation steps of an exemplary system for facilitating network camera backup, comprising a rechargeable battery as its contingency powers source, in accordance with some embodiments of the present invention.

In FIG. 2 there are shown, in accordance with some embodiments of the present invention, the main modules and operation steps of an exemplary system/apparatus for facilitating network camera backup, comprising a rechargeable battery as its contingency powers source and a power management module for switching between a regular power source and two contingency power sources.

Local Storage

According to some embodiments of the present invention, the decision logic, upon determining based on the extracted electric parameters that a drop in power quality has occurred, may issue a respective data storage switching command to a Data Communication and Storage Management Module that in response may switch from the regular storage destination/sink (e.g. remote) to a Local Storage Module (e.g. an SD card). According to some embodiments, an Ethernet Replacement (e.g. IP mirror substitute) may be used as a substitute for the network destination/sink (e.g. an IP address) to which the camera regularly (i.e. under good power quality conditions) relays its data.

It is hereby made clear that any local/contingency/secondary storage module of the present invention, may be implemented using: magnetic, optical, read-only memories (ROMs), random access memories (RAMs), electrically programmable read-only memories (EPROMs), electrically erasable and programmable read only memories (EEPROMs), Flash memory, and/or any other type of media suitable for storing electronic instructions, and capable of being coupled to a computer system bus.

Figure 3:
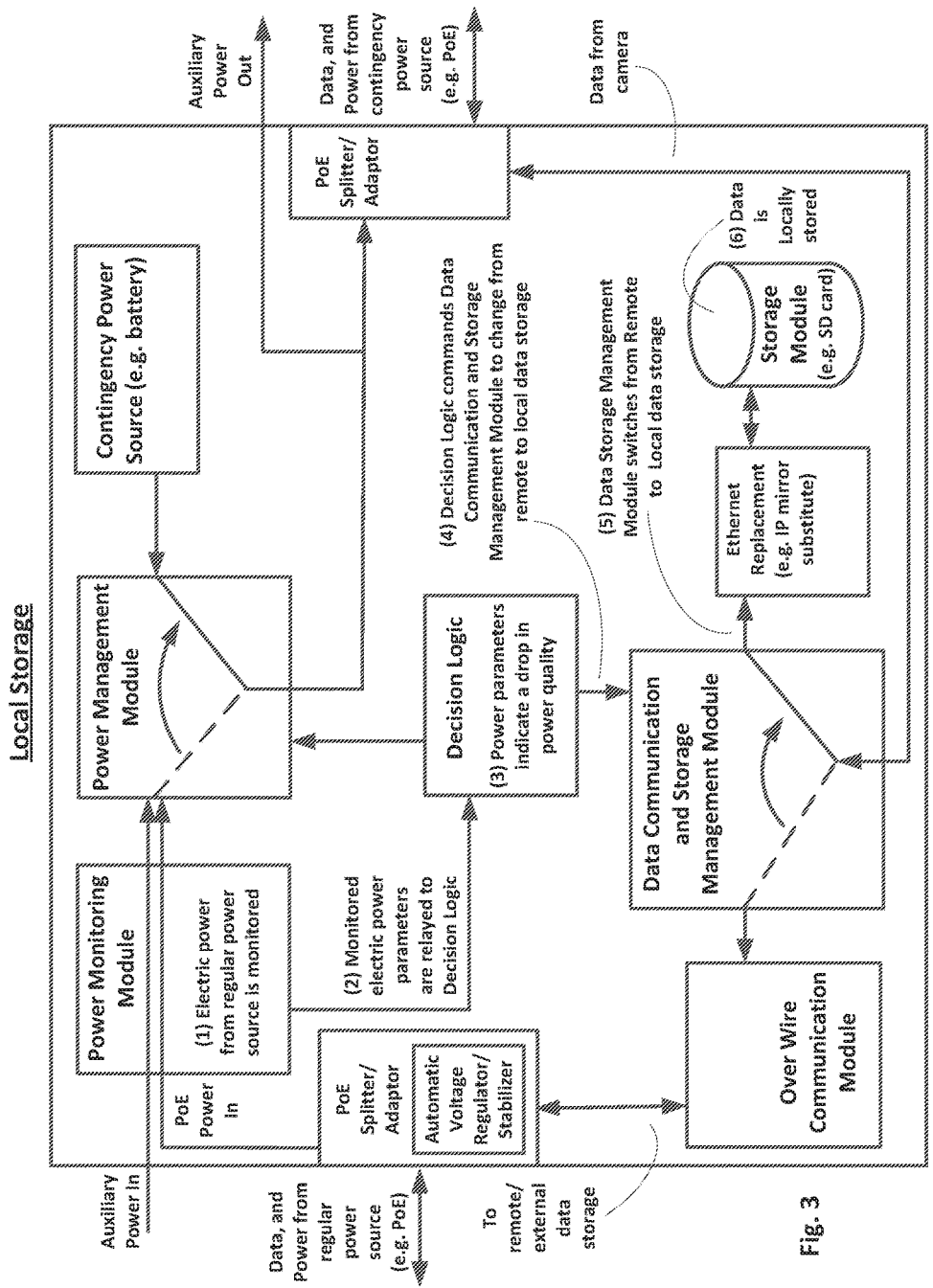
FIG. 3 is a block diagram showing the main modules and operation steps of an exemplary system for facilitating network camera backup, comprising a local data storage module, in accordance with some embodiments of the present invention.

In FIG. 3 there are shown, in accordance with some embodiments of the present invention, the main modules and operation steps of an exemplary system/apparatus for facilitating network camera backup, comprising a local data storage module.

Wireless Storage Access

According to some embodiments of the present invention, the decision logic, upon determining based on the extracted electric parameters that a drop in power quality has occurred, may issue a respective data storage switching command to the Data Communication and Storage Management Module that in response may switch from the regular storage destination/sink (e.g. remote) to a Networked Storage Module accessed through a Wireless Communication Module (e.g. Wi-Fi, Cellular). According to some embodiments, the Ethernet Replacement (e.g. IP mirror substitute) may be used as a substitute for the network destination/sink (e.g. an IP address) to which the camera regularly (i.e. under good power quality conditions) relays its data.

Figure 4:
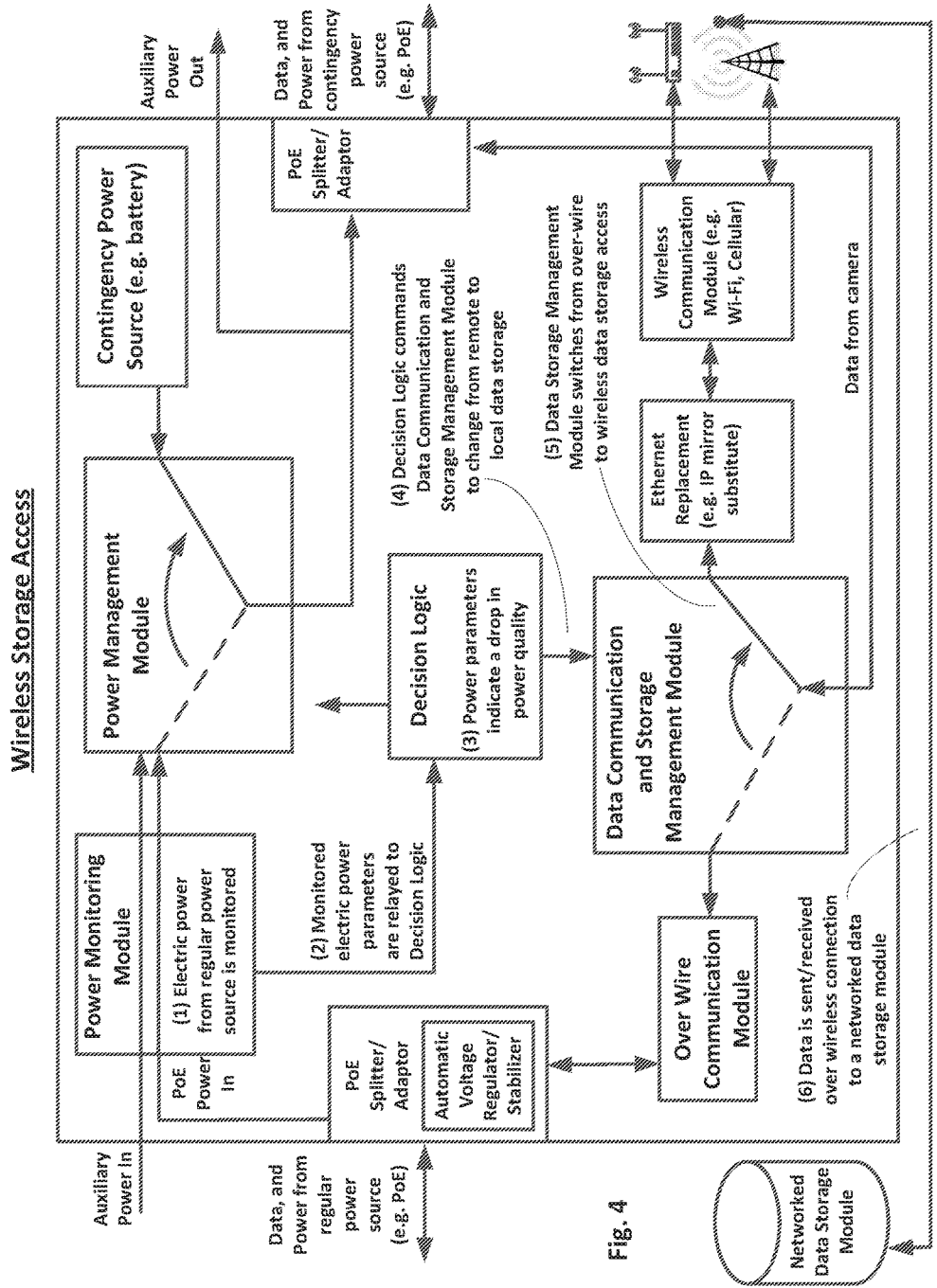
FIG. 4 is a block diagram showing the main modules and operation steps of an exemplary system for facilitating network camera backup, comprising a wirelessly accessed network data storage module, in accordance with some embodiments of the present invention.

In FIG. 4 there are shown, in accordance with some embodiments of the present invention, the main modules and operation steps of an exemplary system/apparatus for facilitating network camera backup, comprising a wirelessly accessed network data storage module.

Combined Wireless Storage Access and Local Storage

According to some embodiments of the present invention, the Data Communication and Storage Management Module, switching from the regular storage destination/sink (e.g. remote), may include and combine between a Networked Storage Module accessed through a Wireless Communication Module (e.g. Wi-Fi, Cellular) and a Local Storage Module (e.g. an SD card). According to some embodiments, combinations between the Networked Storage Module accessed through a Wireless Communication Module (e.g. Wi-Fi, Cellular) and the Local Storage Module (e.g. an SD card) may include: storing data to both destinations, storing certain data or data types to one and other data or data type to the other destination, selecting and storing to only one of the destinations based on their availability, selecting and storing to only one of the destinations based on power quality drop (e.g. based on characteristics of the drop in power quality that occurred and the respective data storage switching command received by the Data Communication and Storage Management Module), and/or any other combination (e.g. system resources based, time based, system environment based).

In FIG. 19 there are shown, in accordance with some embodiments of the present invention, the main modules and operation steps of an exemplary system/apparatus for facilitating network camera backup, comprising a combination of a Networked Storage Module accessed through a Wireless Communication Module (e.g. Wi-Fi, Cellular) and a Local Storage Module.

Degraded Data Quality Storage

According to some embodiments of the present invention, a Storage Space Monitoring Module may intermittently check the remaining storage space available on the Local Storage Module, and relay remaining space indicative data to the Decision Logic. Upon the available space decreasing to/beyond a threshold value, the decision logic may issue a command to degrade the quality of stored camera data to the Data Communication and Storage Management Module, that in response may degrade the quality of camera data stored, thus allowing for a longer temporal record keeping period for a similar amount of available storage space.

Figure 5:
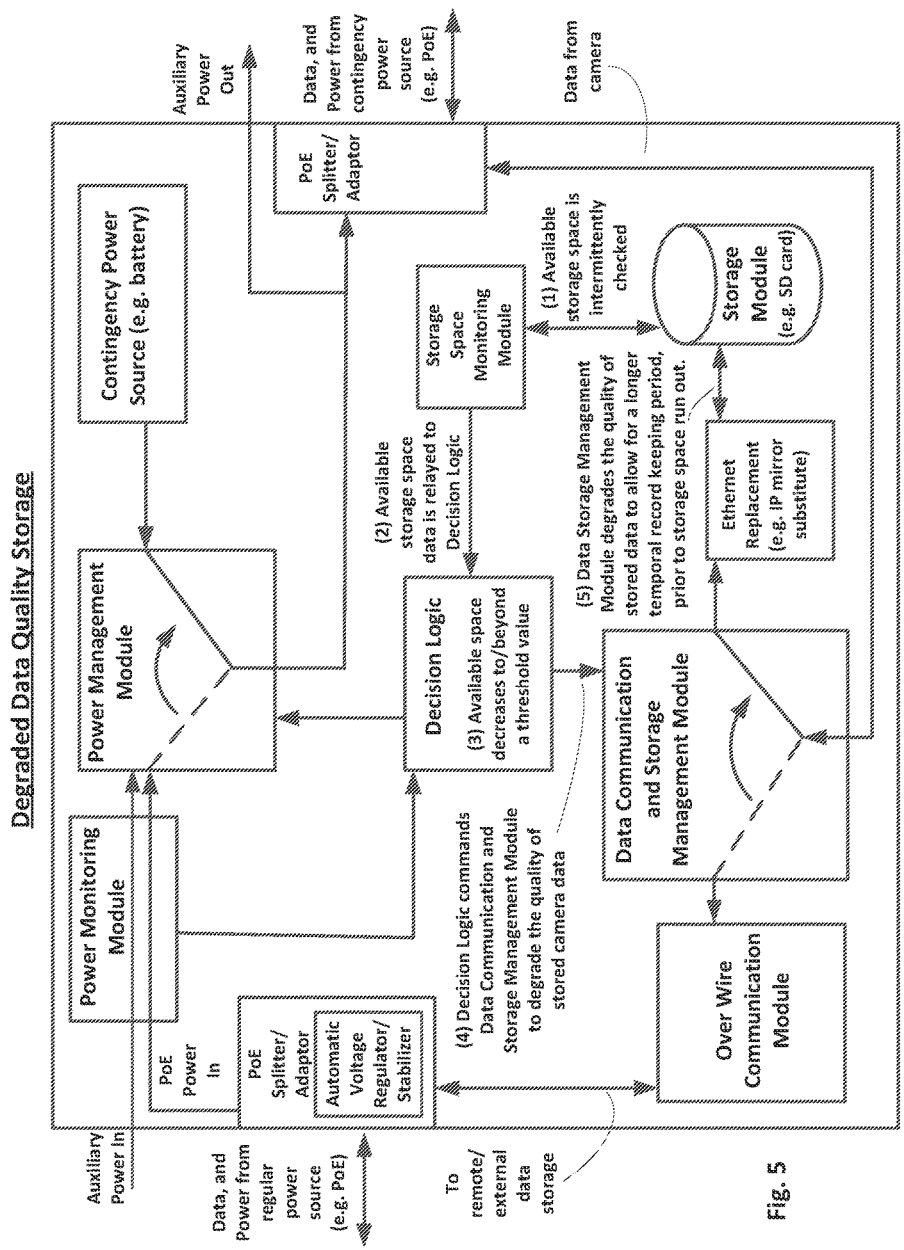
FIG. 5 is a block diagram showing the main modules and operation steps of an exemplary system for facilitating network camera backup, wherein the quality of stored data is degraded to allow for more data, or data of a longer camera operation time period, to be stored, in accordance with some embodiments of the present invention.

In FIG. 5 there are shown, in accordance with some embodiments of the present invention, the main modules and operation steps of an exemplary system/apparatus for facilitating network camera backup, wherein the quality of stored data is degraded to allow for more data, or data of a longer camera operation time period, to be stored.

Wireless Communication (Power)

According to some embodiments of the present invention, the decision logic, upon determining based on the extracted electric parameters that a drop in power quality has occurred, may issue a respective data storage switching command to the Data Communication and Storage Management Module that in response may switch from its regular over wire network connection, to using the Wireless Communication Module (e.g. Wi-Fi, Cellular). According to some embodiments, the Ethernet Replacement (e.g. IP mirror substitute) may be used as a substitute for the network destination/sink (e.g. an IP address) to which the camera regularly (i.e. under good power quality conditions) relays its data.

Figure 6:
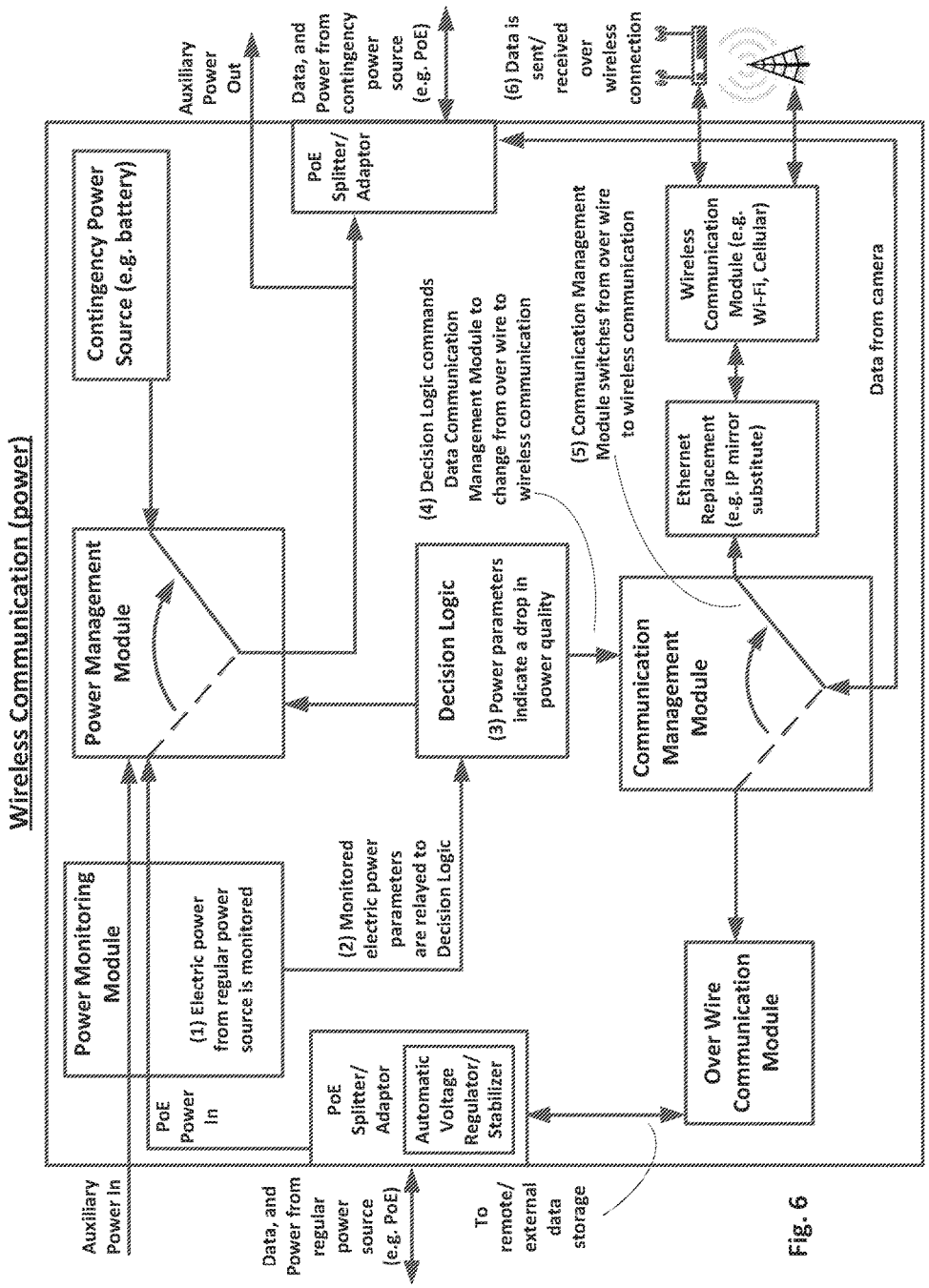
FIG. 6 is a block diagram showing the main modules and operation steps of an exemplary system for facilitating network camera backup, wherein the system switches from its regular (e.g. over wire) communication to wireless (e.g. Wi-Fi, cellular) communication as a result of a drop in power quality, in accordance with some embodiments of the present invention.

In FIG. 6 there are shown, in accordance with some embodiments of the present invention, the main modules and operation steps of an exemplary system/apparatus for facilitating network camera backup, wherein the system switches from its regular (e.g. over wire) communication to wireless (e.g. Wi-Fi, cellular) communication as a result of a drop in power quality.

Wireless Communication (Network)

According to some embodiments of the present invention, a Network Monitoring Module may intermittently check the quality of the regular network connection. The decision logic, upon determining based on the extracted network connection parameters that the regular connection is down/bad, may issue a respective data storage switching command to the Data Communication and Storage Management Module that in response may switch from its regular over wire network connection (determined to be down/bad), to using the Wireless Communication Module (e.g. Wi-Fi, Cellular). According to some embodiments, the Ethernet Replacement (e.g. IP mirror substitute) may be used as a substitute for the network destination/sink (e.g. an IP address) to which the camera regularly (i.e. under good network connection quality conditions) relays its data.

Figure 7:
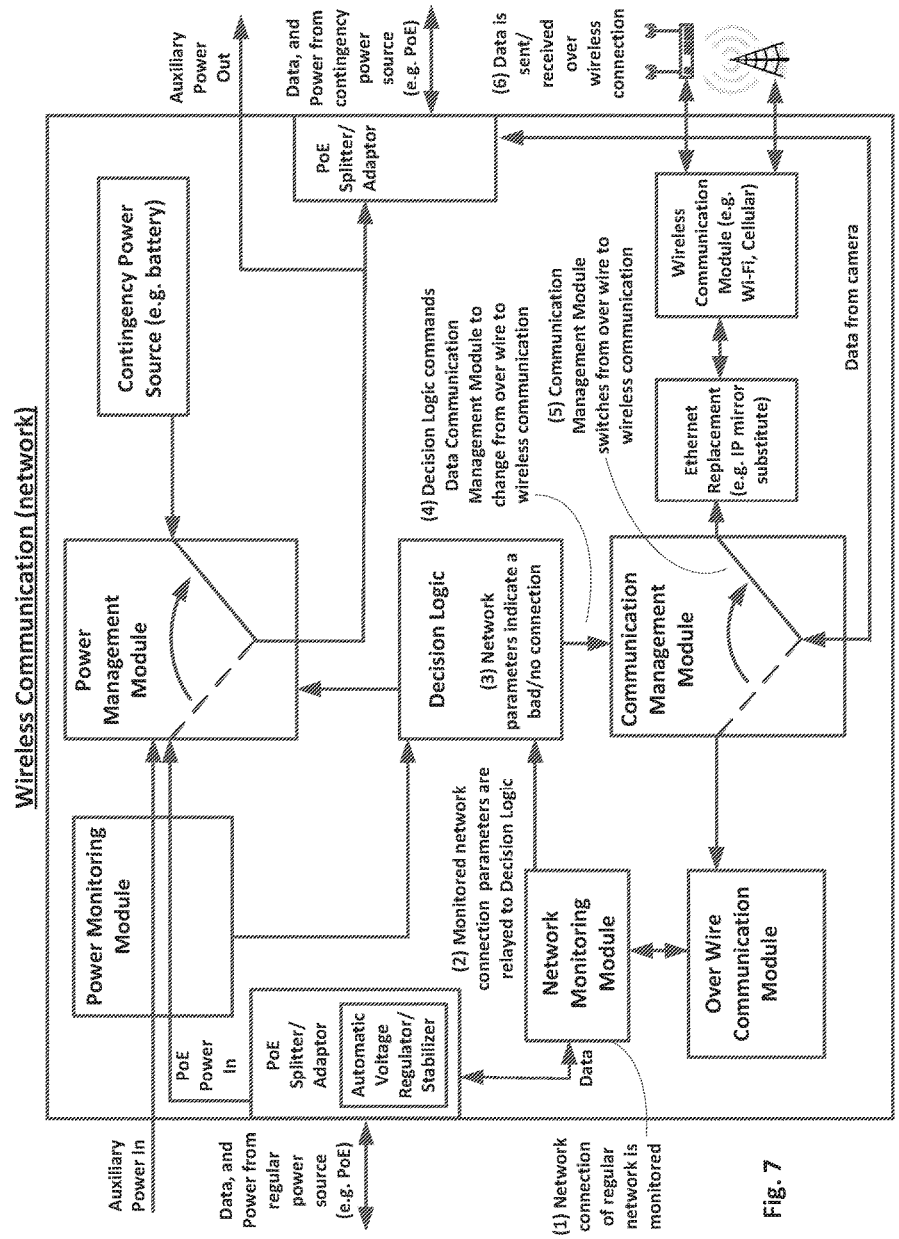
FIG. 7 is a block diagram showing the main modules and operation steps of an exemplary system for facilitating network camera backup, wherein the system switches from its regular (e.g. over wire) communication to wireless (e.g. Wi-Fi, cellular) communication as a result of a drop in the quality of its network connection, in accordance with some embodiments of the present invention.

In FIG. 7 there are shown, in accordance with some embodiments of the present invention, the main modules and operation steps of an exemplary system/apparatus for facilitating network camera backup, wherein the system switches from its regular (e.g. over wire) communication to wireless (e.g. Wi-Fi, cellular) communication as a result of a drop in the quality of its network connection.

Cellular Power Down Alert

According to some embodiments of the present invention, the decision logic, upon determining, based on the extracted electric parameters, that a drop in power quality has occurred, may issue a respective power quality drop notification/alert to the Data Communication and Storage Management Module that in response may use the Wireless Communication Module (e.g. Wi-Fi, Cellular) to send a cellular notification/alert of a drop in power quality to a Camera Administrator Device (e.g. a mobile communication device). According to some embodiments, the Ethernet Replacement (e.g. IP mirror substitute) may be used as a substitute for the network destination/sink (e.g. an IP address) to which the camera regularly (i.e. under good power quality conditions) relays its data.

Figure 8:
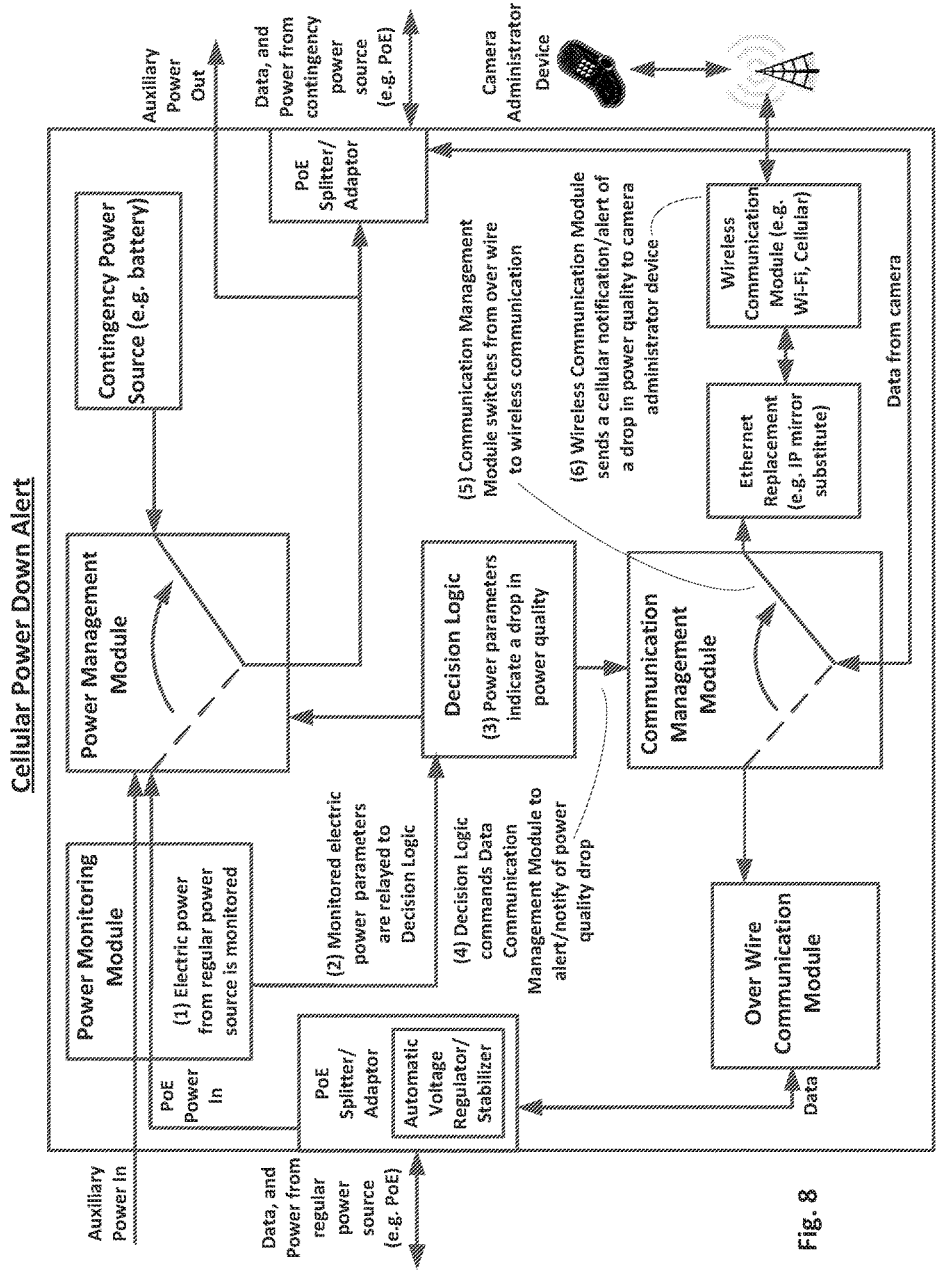
FIG. 8 is a block diagram showing the main modules and operation steps of an exemplary system for facilitating network camera backup, wherein a cellular notification/alert is sent to a mobile communication device of a network camera administrator as a result of a drop in power quality, in accordance with some embodiments of the present invention.

In FIG. 8 there are shown, in accordance with some embodiments of the present invention, the main modules and operation steps of an exemplary system/apparatus for facilitating network camera backup, wherein a cellular notification/alert is sent to a mobile communication device of a network camera administrator as a result of a drop in power quality.

Camera Power Consumption

According to some embodiments of the present invention, a Power Consumption Module may intermittently monitor the power consumption characteristics of the camera and extract power consumption related parameters. The decision logic, upon determining based on the extracted power consumption parameters that low, or no, power is being consumed by the camera, may issue a respective low/no camera power consumption notification/alert to the Data Communication and Storage Management Module that in response may use the Wireless Communication Module (e.g. Wi-Fi, Cellular) to send a cellular notification/alert of low/no camera power consumption to the Camera Administrator Device (e.g. a mobile communication device). According to some embodiments, the Ethernet Replacement (e.g. IP mirror substitute) may be used as a substitute for the network destination/sink (e.g. an IP address) to which the camera regularly (i.e. under good network connection quality conditions) relays its data.

Figure 9:
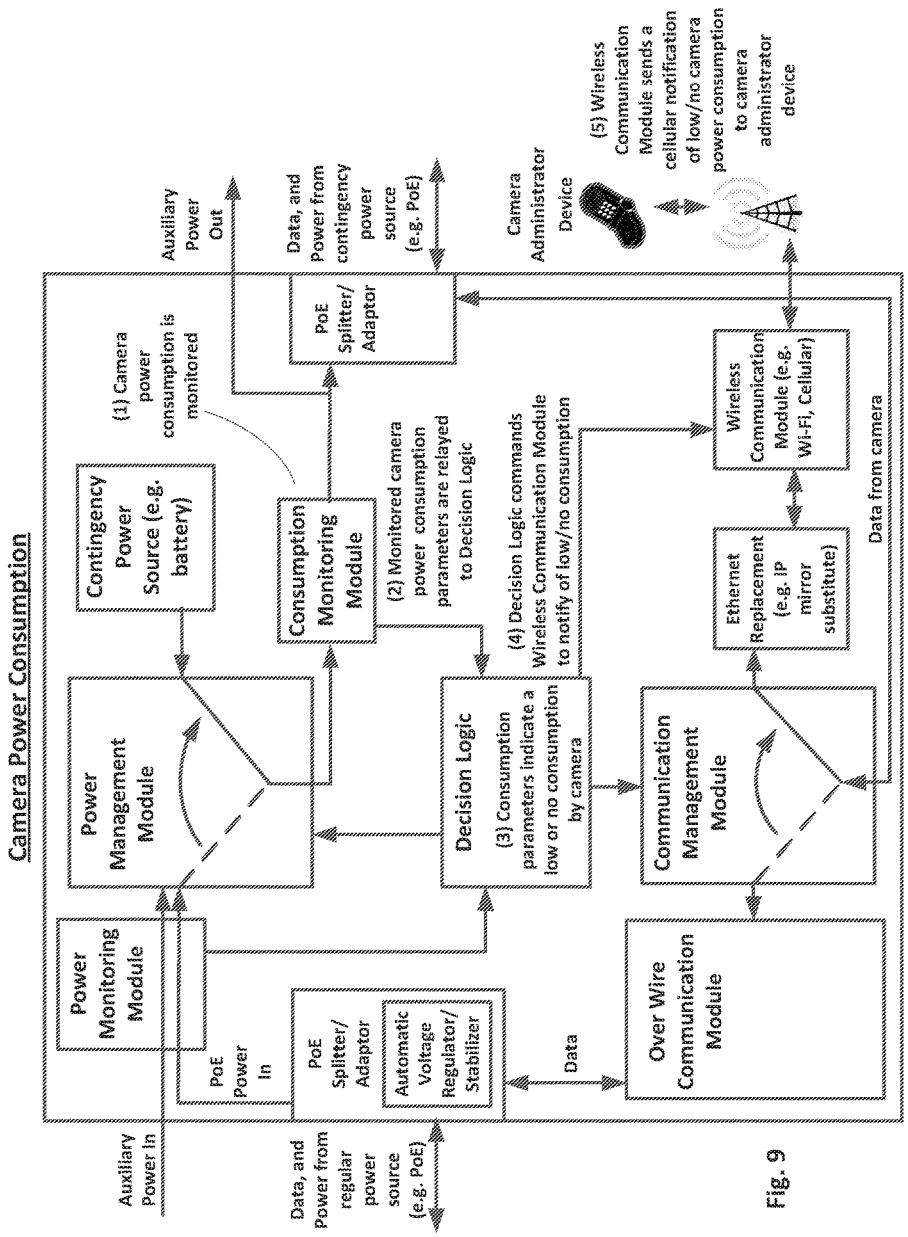
FIG. 9 is a block diagram showing the main modules and operation steps of an exemplary system for facilitating network camera backup, comprising a camera power consumption monitoring module wherein a cellular notification/alert is sent to a mobile communication device of a network camera administrator when no/low power is consumed by the camera, in accordance with some embodiments of the present invention.

In FIG. 9 there are shown, in accordance with some embodiments of the present invention, the main modules and operation steps of an exemplary system/apparatus for facilitating network camera backup, comprising a camera power consumption monitoring module wherein a cellular notification/alert is sent to a mobile communication device of a network camera administrator when no/low power is consumed by the camera.

Camera Power Down

According to some embodiments of the present invention, the Camera Administrator Device (e.g. a mobile communication device) may send a camera power down command through the Wireless Communication Module (e.g. upon receipt of a low/no camera power consumption from the Wireless Communication Module). Camera power down command may be relayed to the Decision Logic that may issue a corresponding command to the Power Management Module to temporarily halt/decrease power supply to the camera causing no/low power to temporarily be supplied to the camera.

Figure 10:
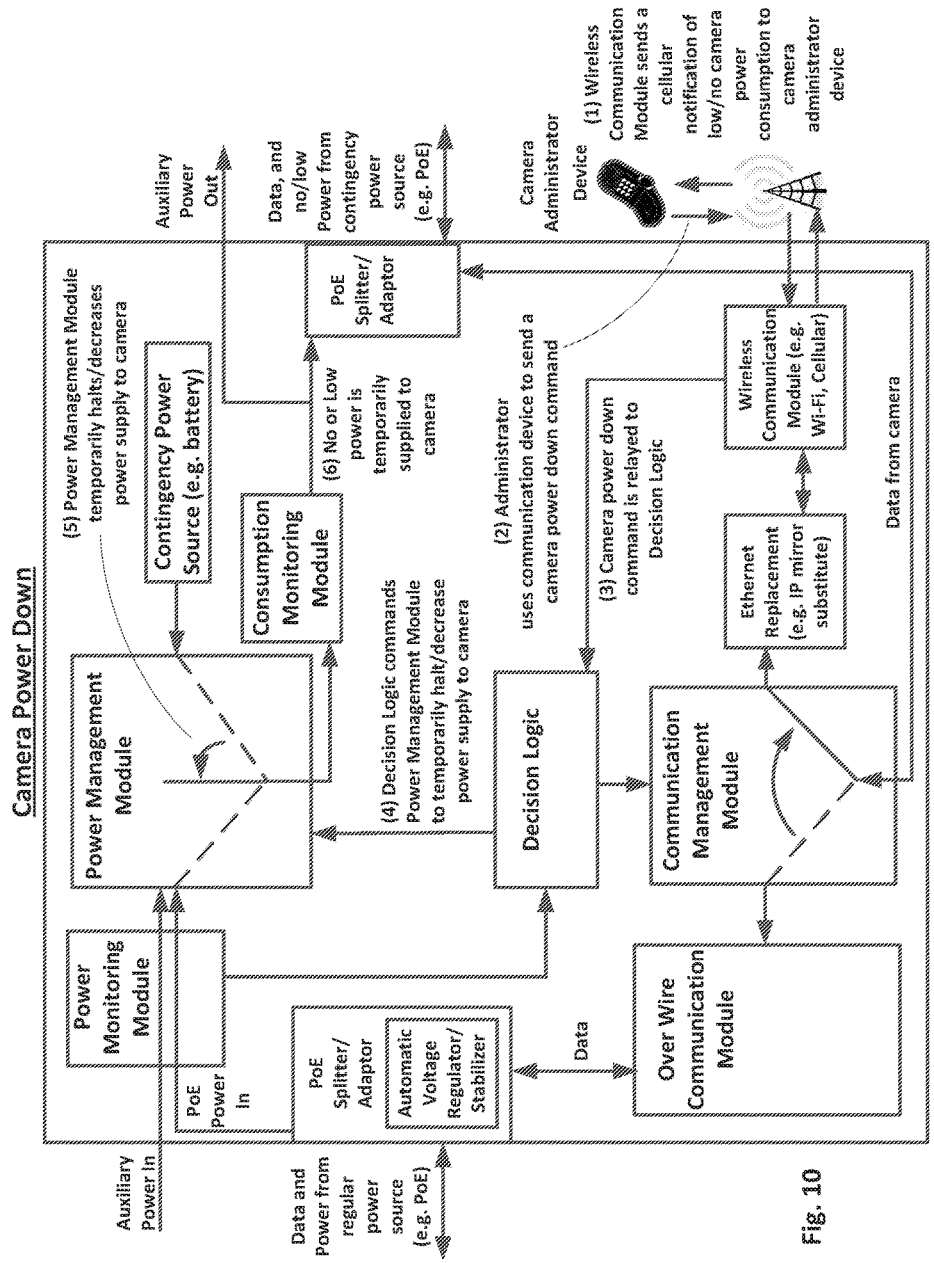
FIG. 10 is a block diagram showing the main modules and operation steps of an exemplary system for facilitating network camera backup, wherein power supply to the camera is temporarily halted/decreased as a result of a power down command from a mobile communication device of a network camera administrator, in accordance with some embodiments of the present invention.

In FIG. 10 there are shown, in accordance with some embodiments of the present invention, the main modules and operation steps of an exemplary system/apparatus for facilitating network camera backup, wherein power supply to the camera is temporarily halted/decreased as a result of a power down command from a mobile communication device of a network camera administrator.

Camera Auto Power Reset

According to some embodiments of the present invention, the Decision Logic, upon receiving camera consumption parameters indicative of low/no consumption by the camera and/or based on a temporal indication/triggering from/by a preset or dynamically-set timer, may automatically issue a corresponding command to the Power Management Module to reset/restart/boot the camera and/or temporarily halt/decrease power supply to it.

Figure 11:
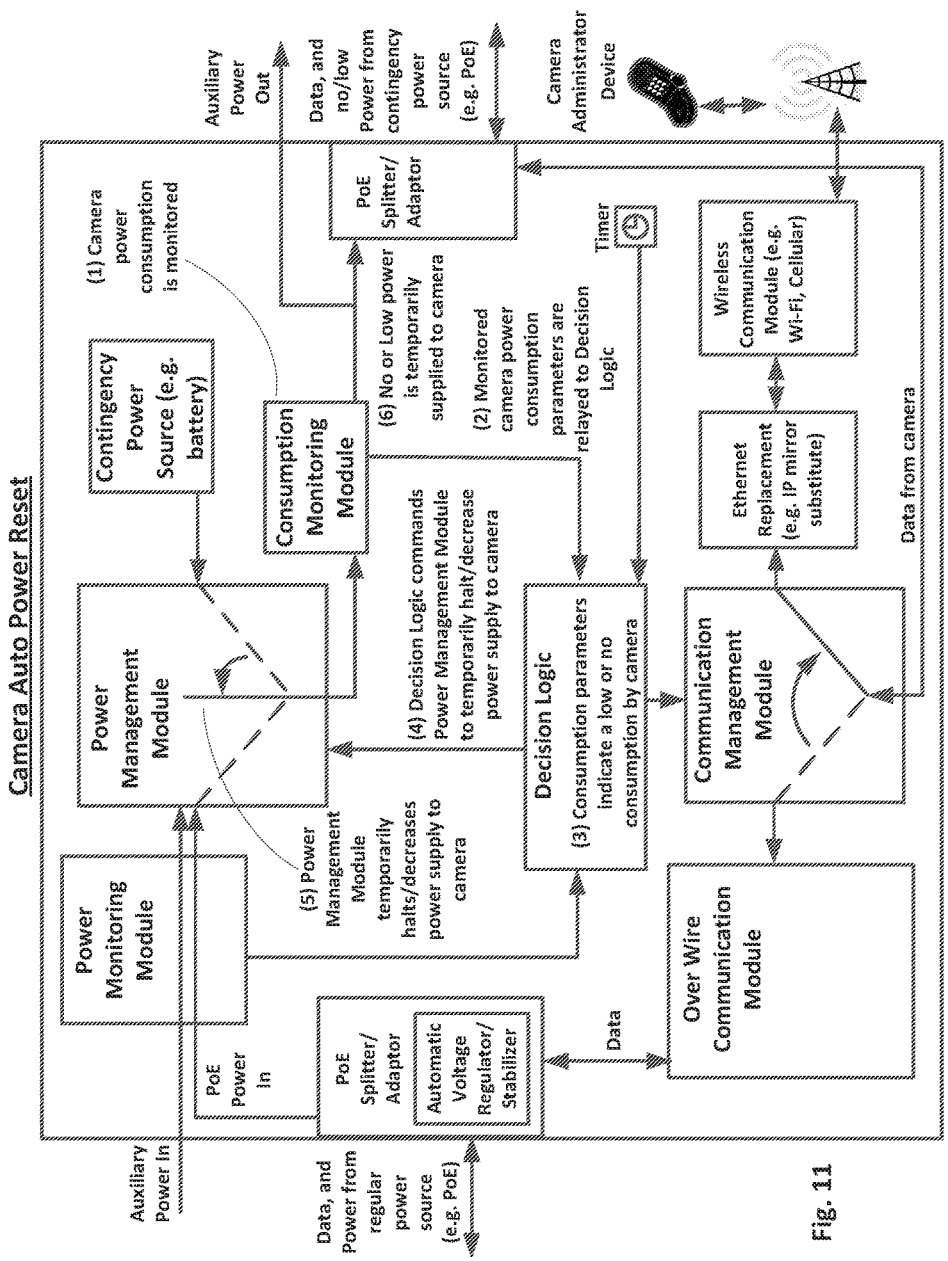
FIG. 11 is a block diagram showing the main modules and operation steps of an exemplary system for facilitating network camera backup, wherein power supply to the camera is automatically temporarily halted/decreased as a result of the camera consumption module parameters indicating low/no power consumption by the camera, in accordance with some embodiments of the present invention.

In FIG. 11 there are shown, in accordance with some embodiments of the present invention, the main modules and operation steps of an exemplary system/apparatus for facilitating network camera backup, wherein power supply to the camera is automatically temporarily halted/decreased as a result of the camera consumption module parameters indicating low/no power consumption by the camera.

Camera Video Parameters

According to some embodiments of the present invention, a Video Monitoring and Analysis Module may monitor the video data stream received from the camera. Video parameters (e.g. resolution, quality, focusing, field of view) may be extracted and relayed to the Decision Logic. The video parameters, possibly following to an initial processing stage, may be communicated to the Camera Administrator Device (e.g. a mobile communication device) through the Wireless Communication Module.

Figure 12:
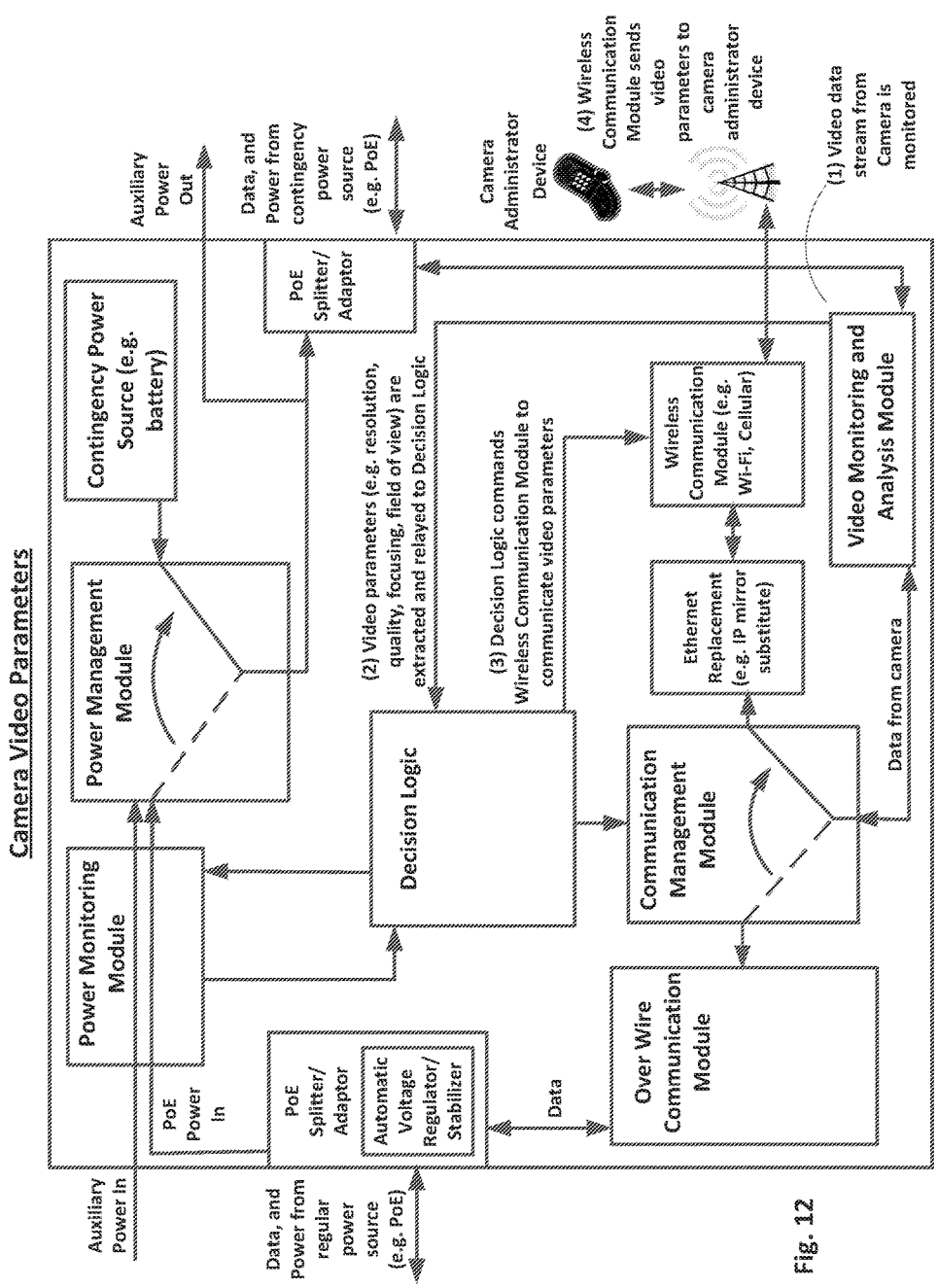
FIG. 12 is a block diagram showing the main modules and operation steps of an exemplary system for facilitating network camera backup, comprising a video monitoring and analysis module for extracting video parameters from a monitored video data stream of a camera, in accordance with some embodiments of the present invention.

In FIG. 12 there are shown, in accordance with some embodiments of the present invention, the main modules and operation steps of an exemplary system/apparatus for facilitating network camera backup, comprising a video monitoring and analysis module for extracting video parameters from a monitored video data stream of a camera.

Camera Control

According to some embodiments of the present invention, the Camera Administrator Device (e.g. a mobile communication device) may send camera control commands through the Wireless Communication Module (e.g. based on received video parameters data from the Wireless Communication Module). A Camera Control Module may receive the commands from the Decision Logic and relay them to the camera.

Figure 13:
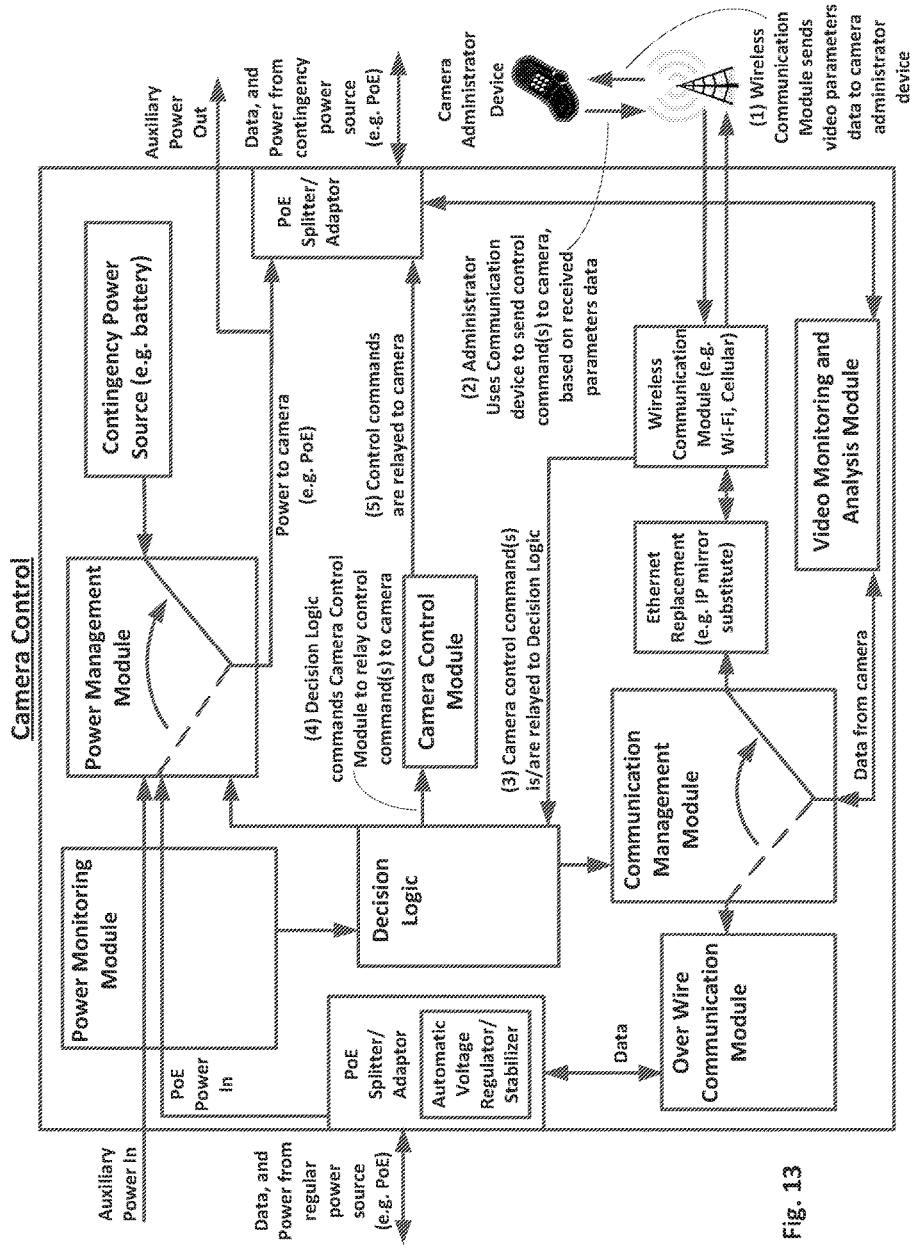
FIG. 13 is a block diagram showing the main modules and operation steps of an exemplary system for facilitating network camera backup, wherein 'video parameters data' based control commands from a mobile communication device of a network camera administrator are relayed to the camera, in accordance with some embodiments of the present invention.

In FIG. 13 there are shown, in accordance with some embodiments of the present invention, the main modules and operation steps of an exemplary system/apparatus for facilitating network camera backup, wherein 'video parameters data' based control commands from a mobile communication device of a network camera administrator are relayed to the camera.

Camera Profile Parameters

According to some embodiments of the present invention, video parameters (e.g. resolution, quality, focusing, field of view), extracted by the Video Monitoring and Analysis Module and relayed to the Decision Logic, may be compared by the Decision Logic to stored 'operation parameters profile' of the monitored camera. According to some embodiments, the Decision Logic may issue commands to the Camera Control Module, and from there to the camera, at least partially based on the results of the comparison to the 'operation parameters profile' of that camera.

Figure 14:
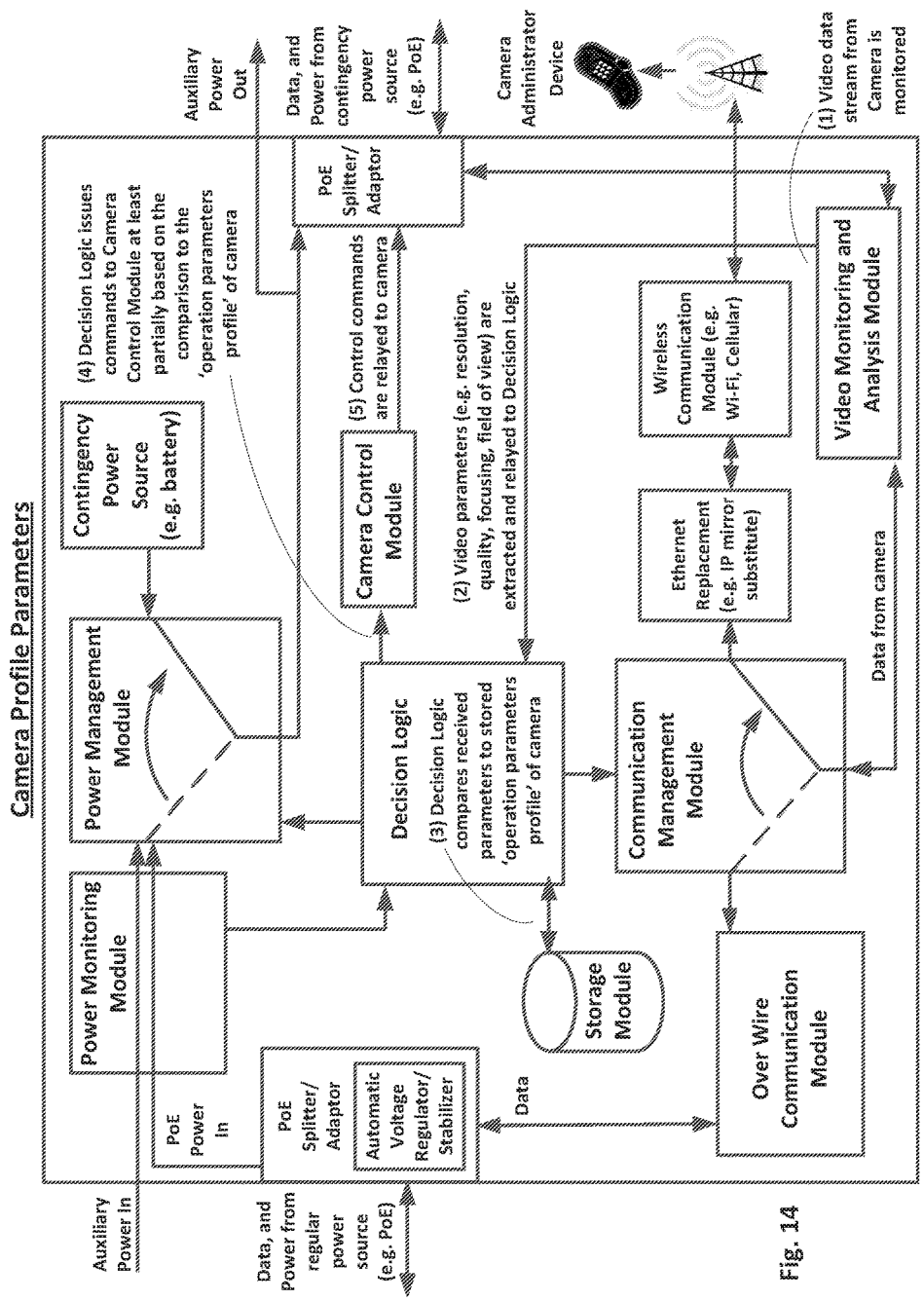
FIG. 14 is a block diagram showing the main modules and operation steps of an exemplary system for facilitating network camera backup, wherein control commands, based on a comparison between video parameters extracted from a monitored video data stream of a camera and an 'operation parameters profile' of that camera, are relayed to the camera, in accordance with some embodiments of the present invention.

In FIG. 14 there are shown, in accordance with some embodiments of the present invention, the main modules and operation steps of an exemplary system/apparatus for facilitating network camera backup, wherein control commands, based on a comparison between video parameters extracted from a monitored video data stream of a camera and an 'operation parameters profile' of that camera, are relayed to the camera.

Zero Power Drop

According to some embodiments of the present invention, power from a Contingency Power Source, such as a battery, may be repetitively boosted by a Battery Voltage Booster, while remaining in a standby mode (FIG. 15A). A drop in electric PoE input power may trigger an Electronic OR Logic Gate to switch from the PoE input power to the boosted Contingency Power Source (FIG. 15B). According to some embodiments, the power may be substantially instantly switched such that no, or only negligible, power drop is 'felt' by the power supplied camera and/or edge device.

In FIGS. 15A and 15B there are shown, in accordance with some embodiments of the present invention, the main modules and operation steps of an exemplary system/apparatus for facilitating network camera backup, wherein an Electronic OR logic gate switches between boosted battery power (15B) and PoE input power (15A).

Media Adaptors

Figure 16:
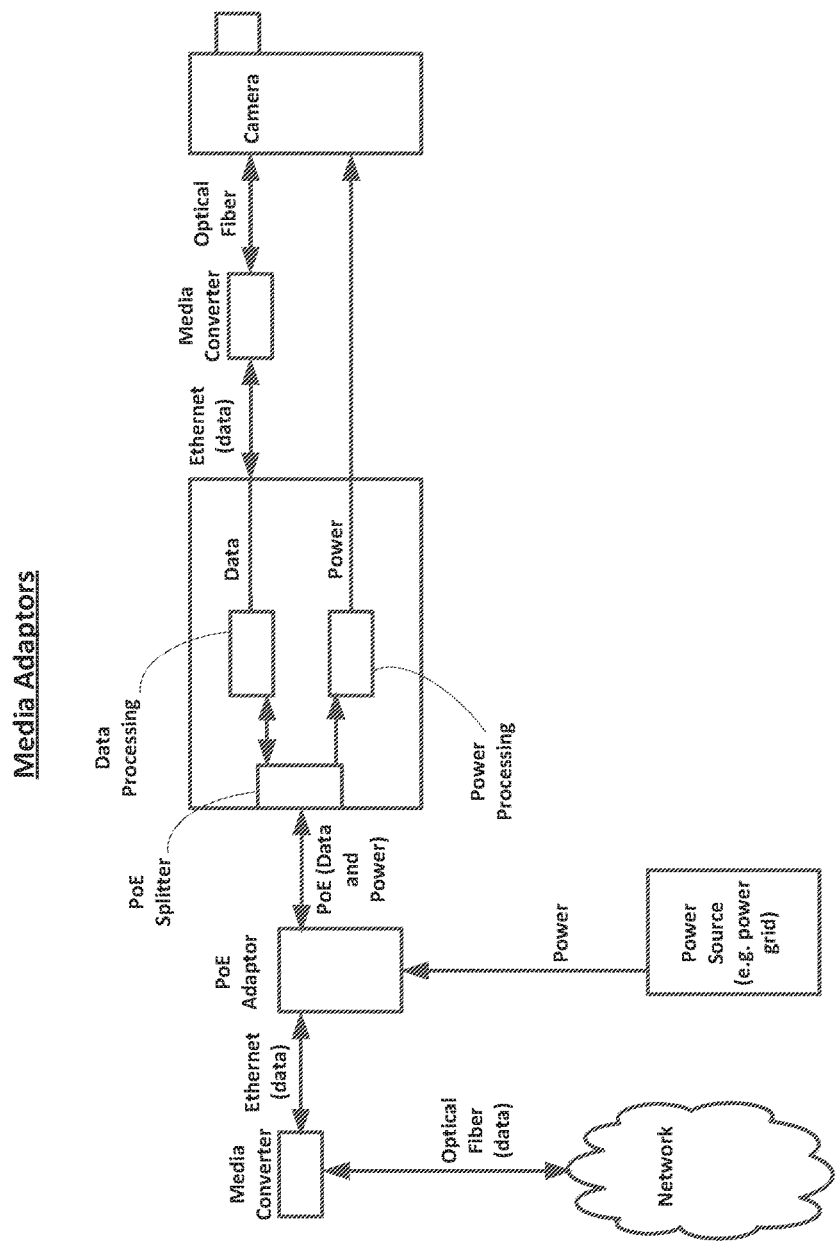
FIG. 16 is a block diagram showing the main modules and operation steps of an exemplary system for facilitating network camera backup, wherein media converters are used for switching system data communications from one cable medium to another, in accordance with some embodiments of the present invention.

In FIG. 16 there are shown, in accordance with some embodiments of the present invention, the main modules and operation steps of an exemplary system/apparatus for facilitating network camera backup, wherein media converters are used for switching system data communications from one cable medium to another.

Operation Flow

Figure 17:
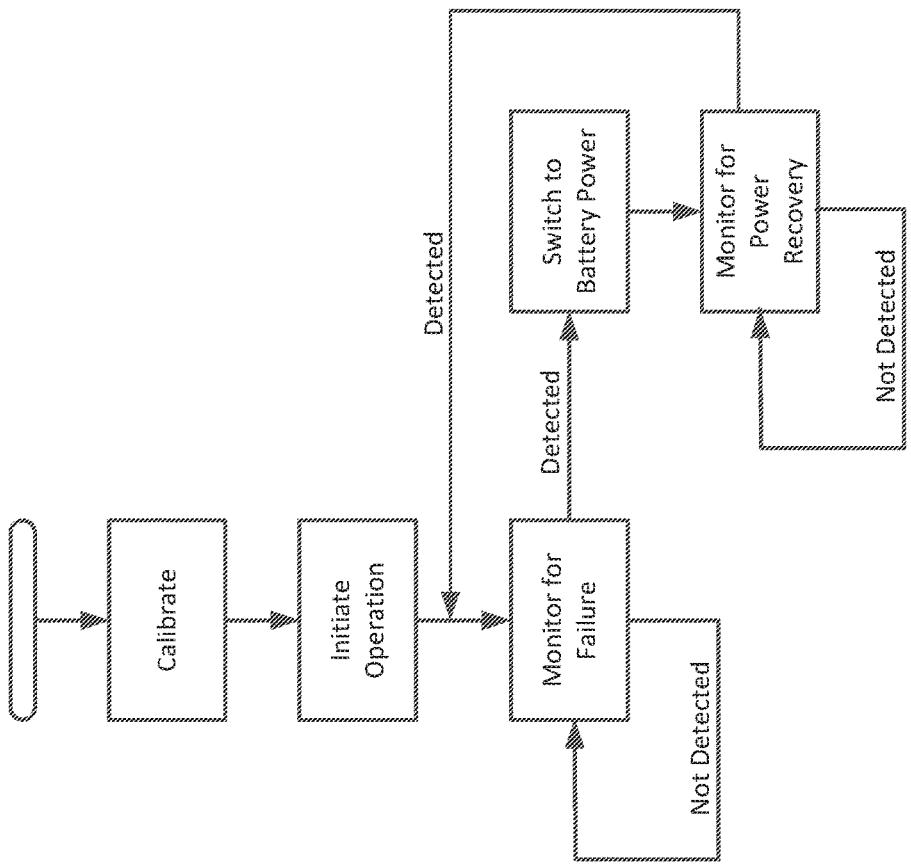
FIG. 17 is a flowchart showing the main operation steps of an exemplary apparatus for facilitating network camera backup, in accordance with some embodiments of the present invention.

In FIG. 17 there are shown, in accordance with some embodiments of the present invention, the main method operation steps executed by an exemplary system/apparatus for facilitating network camera backup.

System Configuration

Figure 18:
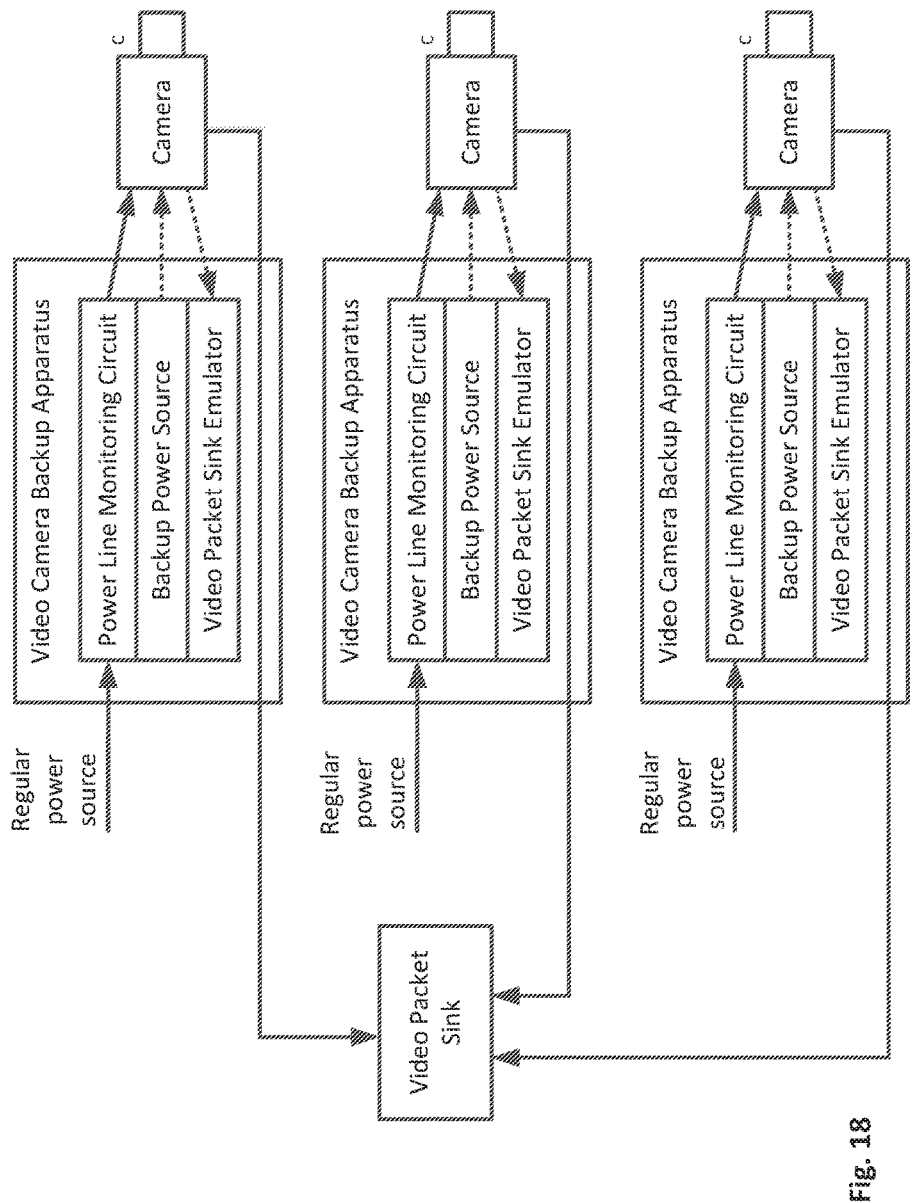
FIG. 18 is a block diagram showing the main modules and components of an exemplary system configuration for facilitating network camera backup, in accordance with some embodiments of the present invention.

In FIG. 18 there are shown, in accordance with some embodiments of the present invention, the main modules, components and relations of an exemplary system configuration for facilitating network camera backup.

According to some embodiments of the present invention, a video camera backup apparatus may comprise: a camera power-line monitoring circuit to detect an inoperable electrical power condition (IEPC) on the power-line; a backup power source to provide electrical power to the camera upon detection of an IEPC; and a video packet sink emulator adapted to emulate a video packet sink of the video camera upon detecting a connectivity fault between the video camera and the video packet sink.

According to some embodiments, an IEPC may include one or more conditions from the group consisting of: (1) power down, and/or (2) power drop. According to some embodiments, the power-line may be a Power over Ethernet (PoE) power-line. According to some embodiments, detection of power-loss on the PoE may indicate a connectivity fault between the video camera and the video packet sink. According to some embodiments, detection of power-loss on the PoE may trigger the video packet emulator to emulate the video packet sink. According to some embodiments the sink emulator may include a digital data storage medium. According to some embodiments, the sink emulator may include a connectivity fault detector. According to some embodiments, the backup power source may be a rechargeable battery, and power from the PoE line may be used to charge the rechargeable battery. According to some embodiments, an auxiliary backup power source may act as an alternative backup source to provide electrical power to the camera upon detection of an IEPC.

According to some embodiments of the present invention, a video monitoring system may comprise: one or more video cameras; a video packet sink to receive video packets from each of said one or more video cameras; and a video camera backup apparatus coupled/connected/residing between each of the one or more video cameras and the video packet sink, wherein the backup apparatus may include: (1) a camera power-line monitoring circuit to detect an inoperable electrical power condition (IEPC) on a camera power-line; (2) a backup power source to provide electrical power to the camera upon detection of an IEPC; and/or (3) a video packet sink emulator adapted to emulate a video packet sink of the video camera upon detecting a connectivity fault between the video camera and the video packet sink.

According to some embodiments, an IEPC may include one or more conditions from the group consisting of: (1) power down, and/or (2) power drop. According to some embodiments, the power-line may be a Power over Ethernet (PoE) power-line. According to some embodiments, detection of power-loss on the PoE may indicate a connectivity fault between the video camera and the video packet sink. According to some embodiments, detection of power-loss on the PoE may trigger the video packet emulator to emulate the video packet sink. According to some embodiments, the sink emulator may include a digital data storage medium. According to some embodiments, the sink emulator may include a connectivity fault detector.

According to some embodiments of the present invention, an edge device power backup apparatus may comprise: a PoE line to charge a backup battery; a PoE line monitoring circuit to detect an inoperable electrical power condition (IEPC) on the PoE line; and/or the backup battery to provide electrical power via PoE to the PoE edge device upon detection of an IEPC. According to some embodiments, the apparatus may further comprise a packet sink emulator adapted to emulate a packet sink of the edge device upon detection of an IEPC. According to some embodiments, an IEPC may include one or more conditions from the group consisting of: (1) power down, and/or (2) power drop. According to some embodiments, detection of power-loss on the PoE may indicate a connectivity fault between the edge device and the edge device packet sink. According to some embodiments, detection of power-loss on the PoE may trigger the packet sink emulator to emulate the packet sink. According to some embodiments, the sink emulator may include a digital data storage medium.

According to some embodiments of the present invention, an edge device power backup apparatus may comprise: a PoE line to charge a backup battery; a PoE line monitoring circuit to detect an inoperable electrical power condition (IEPC) on the PoE line; a battery voltage booster to repetitively boost the voltage of said backup battery; and an electronic OR logic gate to switch from the PoE line input power to the boosted power of said backup battery, upon detection of an IEPC.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A Power over Ethernet (PoE) power backup device for providing power to one or more edge device, said device comprising:
   an input port to receive an Ethernet line from an Ethernet switch;
   an auxiliary power input port to receive power from a power-supply;
   a PoE output port to connect with an Ethernet line to a PoE enabled edge device;
   a power storage circuit to store electrical power; and
   power management circuits comprising:
   (a) power detection circuitry to detect available power on the PoE input port and on the auxiliary power input port;
   (b) power switching circuitry to switch available power from either of the input ports to the PoE output port, to the power storage circuit, wherein said power storage circuit includes a power storage element and a charging circuit to charge the power storage element with switched available power from either of the input ports not used by PoE enabled edge device; and
   (c) control circuitry to regulate the power switching circuits based on an output from the power detection circuits, wherein said control circuitry is further adapted to cause the power management circuits to draw relatively more power from said auxiliary input port than from said PoE power input port responsive to said power detection circuits detecting a power drop condition in power supplied through said PoE input port.

2. The device according to claim 1, further comprising an auxiliary power output circuit switchably connected to either of the power input ports and optionally also to the power storage circuit.

3. The device according to claim 2, wherein said control circuitry is further adapted to cause the power management circuits to reduce power supplied to said auxiliary power output circuit responsive to said power detection circuits detecting a power drop condition with power supplied through said PoE input port or said auxiliary power input port.

4. The device according to claim 1, wherein said control circuitry is further adapted to cause the power management circuits to draw power from said power storage circuitry responsive to said power detection circuitry detecting a power drop condition in power supplied through: (a) said PoE input port, (b) said auxiliary power input port, or (c) both ports.

5. The device according to claim 1, wherein said control circuitry is further adapted to cause the power switching circuitry to switch surplus power supplied through said PoE input port or said auxiliary power input port for charging said power storage element.

6. The device according to claim 5, wherein said power storage element is a rechargeable battery.

7. The device according to claim 5, wherein said control circuitry is further adapted to cause the power switching circuitry to switch from power supplied through said PoE input port, or from power supplied through said auxiliary power input port, to power from said backup power storage element, upon said power detection circuits detecting a power loss or power drop condition on either or both input ports.

8. A system comprising:
   one or more edge devices; and
   a power over Ethernet (PoE) power backup device for providing power to one or more of said edge devices, said backup device comprising:
   a PoE input port to receive an Ethernet line from an Ethernet switch;
   an auxiliary power input port to receive power from a power-supply;
   a PoE output port to connect with an Ethernet line to a PoE enabled edge device;
   a power storage circuit to store electrical power; and
   power management circuits comprising:
   (a) power detection circuitry to detect available power on the PoE input port and on the auxiliary power input port;
   (b) power switching circuitry to switch available power from either of the input ports to the PoE output port and to the power storage circuit, wherein said power storage circuit includes a power storage element and a charging circuit to charge the power storage element with switched available power not used by PoE enabled edge device; and
   (c) control circuitry to regulate the power switching circuits based on an output from the power detection circuits, wherein said control circuitry is further adapted to cause the power management circuits to draw relatively more power from said auxiliary input port than from said PoE power input port responsive to said power detection circuits detecting a power drop condition in power supplied through said PoE input port.

9. The system according to claim 8, wherein said device further comprises an auxiliary power output circuit switchably connected to either of the power input ports and optionally also to the power storage circuit.

10. The system according to claim 9, wherein said control circuitry is further adapted to cause the power management circuits to reduce power supplied to said auxiliary power output circuit responsive to said power detection circuits detecting a power drop condition with power supplied through said PoE input port or said auxiliary power input port.

11. The system according to claim 8, wherein said control circuitry is further adapted to cause the power management circuits to draw power from said power storage circuitry responsive to said power detection circuitry detecting a power drop condition in power supplied through: (a) said PoE input port, (b) said auxiliary power input port, or (c) both ports.

12. The system according to claim 8, wherein said control circuitry is further adapted to cause the power switching circuitry to switch surplus power supplied through said PoE input port or said auxiliary power input port for charging said power storage element.

13. The system according to claim 12, wherein said power storage element is a rechargeable battery.

14. The system according to claim 12, wherein said control circuitry is further adapted to cause the power switching circuitry to switch from power supplied through said PoE input port, or from power supplied through said auxiliary power input port, to power from said backup power storage element, upon said power detection circuits detecting a power loss or power drop condition on either or both input ports.

15. A method of providing power to one or more edge devices, said method comprising:
  receiving power through a PoE input port connected to an Ethernet line from an PoE enabled Ethernet switch;
  receiving power through an auxiliary power input port connected to a power-supply;
  providing power to a PoE output port connected with an Ethernet line to a PoE enabled edge device;
  storing surplus power on a power storage circuits; and
  managing power switching between ports and power storage circuit by:
(a) automatically detecting available power on the PoE input port and on the auxiliary power input port; and
(b) automatically regulating power switching based on power detection, wherein regulating includes drawing relatively more power from the auxiliary input port than from the PoE power input port responsive to detection of a power drop condition in power supplied through the PoE input port.

* * * * *